US010482427B2

(12) United States Patent
Abraham et al.

(10) Patent No.: US 10,482,427 B2
(45) Date of Patent: Nov. 19, 2019

(54) SYSTEM AND METHOD FOR CONCEPT DISCOVERY WITH ONLINE INFORMATION ENVIRONMENTS

(71) Applicant: WORLDONE, INC., New York, NY (US)

(72) Inventors: George Abraham, Medford, MA (US); Lik Fun Chan-Do, Medford, MA (US); Jason Robert Hillebrecht, Medford, MA (US); Jonathan S. Michaeli, Medford, MA (US); Pieter Sheth-Voss, Medford, MA (US)

(73) Assignee: WORLDONE, INC., New York, NY (US)

( * ) Notice: Subject to any disclaimer, the term of this patent is extended or adjusted under 35 U.S.C. 154(b) by 0 days.

(21) Appl. No.: 14/202,277

(22) Filed: Mar. 10, 2014

(65) Prior Publication Data

US 2014/0310607 A1 Oct. 16, 2014

Related U.S. Application Data

(60) Provisional application No. 61/784,435, filed on Mar. 14, 2013.

(51) Int. Cl.
*G06Q 10/10* (2012.01)
*G06F 16/951* (2019.01)
(Continued)

(52) U.S. Cl.
CPC ....... *G06Q 10/1053* (2013.01); *G06F 3/0484* (2013.01); *G06F 16/2457* (2019.01);
(Continued)

(58) Field of Classification Search
None
See application file for complete search history.

(56) References Cited

U.S. PATENT DOCUMENTS 5,864,844 A 1/1999 James et al.
5,924,074 A * 7/1999 Evans .................. G06F 19/322
705/2
(Continued)

OTHER PUBLICATIONS

Ashdamle. "MEDgle—personalized medical search screencast", Oct. 24, 2007 [online], [retrieved on Aug. 7, 2014]. Retrieved from the Internet: <URL:https://ww.youtube.com/watch?v=HafE3eFpxWQ>.
(Continued)

*Primary Examiner* — Beau D Spratt
(74) *Attorney, Agent, or Firm* — Wolf, Greenfield & Sacks, P.C.

(57) ABSTRACT

Provided are systems and methods for referencing intent-based taxonomies to enable more natural approaches for users to specify problems to be solved, questions to be answered, and other content requests that can be delivered within online communities. In the medical setting, physicians and medical personnel are accustomed to provide medical information and ask questions of other physicians in the form of a narrative which can be organized around medical cases. Intuitive user interfaces are provided that facilitate definition of intent during case generation and case searching. Linking UI displays and narrative data structures associated with intent information can enable definition and navigation of intent-based models of the cases. Intent-based models can reflect standardize concepts (e.g., medical diagnoses and medical concept ontologies) facilitating their navigation based on intent. Further, the intent-based models of cases can include additional close-ended selections in the UI to further interact with intent-based models of cases.

23 Claims, 14 Drawing Sheets

(51) Int. Cl.
  *G06F 16/2457* (2019.01)
  *G06F 3/0484* (2013.01)
  *G06F 16/30* (2019.01)
(52) U.S. Cl.
  CPC ............ *G06F 16/30* (2019.01); *G06F 16/951* (2019.01); *G06Q 10/10* (2013.01)

(56) References Cited

U.S. PATENT DOCUMENTS

| | | |
|---|---|---|
| 7,209,923 B1 | 4/2007 | Cooper |
| 8,285,697 B1 | 10/2012 | Truher |
| 8,429,179 B1 | 4/2013 | Mirhaji |
| 8,438,074 B2 | 5/2013 | Serbanescu |
| 2003/0146926 A1 | 8/2003 | Valdes |
| 2004/0243568 A1 | 12/2004 | Wang et al. |
| 2006/0074980 A1 | 4/2006 | Sarkar |
| 2008/0120296 A1* | 5/2008 | Kariathungal ........ G06F 19/322 |
| 2009/0070103 A1 | 3/2009 | Beggelman et al. |
| 2010/0036676 A1* | 2/2010 | Safdi ..................... G06F 19/321 |
| | | 705/2 |
| 2010/0094874 A1 | 4/2010 | Huber et al. |
| 2010/0179827 A1* | 7/2010 | McCallie, Jr. ......... G06Q 50/24 |
| | | 705/3 |
| 2011/0015939 A1 | 1/2011 | Gonzalez |
| 2011/0035295 A1 | 2/2011 | Lifson |
| 2011/0093481 A1 | 4/2011 | Hussam |
| 2011/0122138 A1 | 5/2011 | Schmidt et al. |
| 2011/0208822 A1 | 8/2011 | Rathod |
| 2011/0295896 A1 | 12/2011 | Klein et al. |
| 2012/0010867 A1 | 1/2012 | Eder |
| 2012/0041758 A1 | 2/2012 | Imoto et al. |
| 2012/0078062 A1* | 3/2012 | Bagchi .................... A61B 5/00 |
| | | 600/300 |
| 2012/0088524 A1* | 4/2012 | Moldavsky ............ G06Q 30/02 |
| | | 455/456.3 |
| 2012/0101847 A1* | 4/2012 | Johnson ................ G06Q 10/00 |
| | | 705/3 |
| 2012/0203798 A1* | 8/2012 | Gifford ................. G06F 19/322 |
| | | 707/783 |
| 2012/0215551 A1* | 8/2012 | Flanagan ............... G06Q 10/10 |
| | | 705/2 |
| 2012/0245952 A1* | 9/2012 | Halterman .......... G06F 19/3425 |
| | | 705/2 |
| 2013/0030832 A1* | 1/2013 | Heyman ................ G06F 19/34 |
| | | 705/2 |
| 2013/0155118 A1 | 6/2013 | Robinson et al. |
| 2013/0191156 A1* | 7/2013 | Upadhyayula ......... G06Q 10/10 |
| | | 705/3 |
| 2013/0236871 A1* | 9/2013 | Weidner, Jr. ........... G09B 23/28 |
| | | 434/262 |
| 2013/0297351 A1* | 11/2013 | Phillips ................ G06Q 10/103 |
| | | 705/4 |
| 2014/0188931 A1* | 7/2014 | Smiling ............ G06F 17/30545 |
| | | 707/770 |
| 2014/0310190 A1 | 10/2014 | Abraham et al. |
| 2014/0310311 A1 | 10/2014 | Abraham et al. |
| 2015/0025904 A1* | 1/2015 | Rao ........................ G06Q 50/22 |
| | | 705/2 |

OTHER PUBLICATIONS

Ashdamle. "MEDgle Clinical GPS Screencast Short Example 1", Jul. 17, 2010 [online], [retrieved on Aug. 7, 2014]. Retrieved from the Internet: <URL:https://www.youtube.com/watch?v=g7OeaSn2-E8>.
Notification of Transmittal of the International Search Report and the Written Opinion of the International Searching Authority from corresponding PCT/US/2014/022436 dated Oct. 6, 2014.
Roush, W. "HealthTap Positions Itself for Rush of Obamacare Patients in 2014", Mar. 7, 2013 [online]. [retrieved on Aug. 12, 2014]. Retrieved from the Internet: <URL: http://www.xconomy.com/san-francisco/2013/03/07/healthtap-positions-itself-for-rush-of-obamacare-patients-in-2014/?single_page=true>.
Sermomd. "Sermo IPhone App—iConsult", Jul. 4, 2011 [online], [retrieved on Aug. 7, 2014]. Retrieved from the Internet: <URL: https://www.youtube.com/watch?v=LHE6dM0eLJg>.
International Preliminary Report on Patentability dated Sep. 24, 2015 for corresponding International Application No. PCT/US2014/022436.
Invitation to Pay Additional Fees dated Jul. 17, 2014 for corresponding International Application No. PCT/US2014/022436.

* cited by examiner

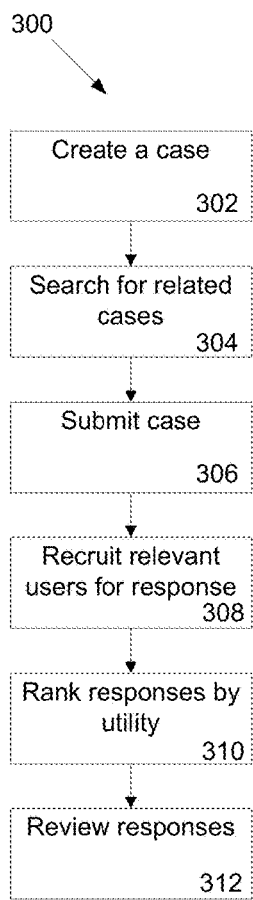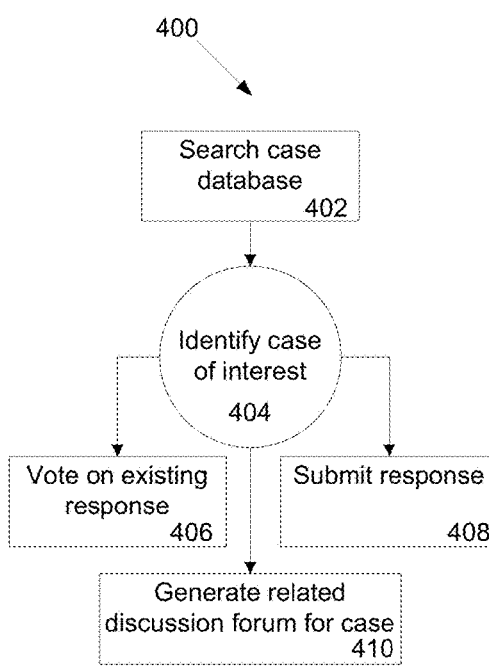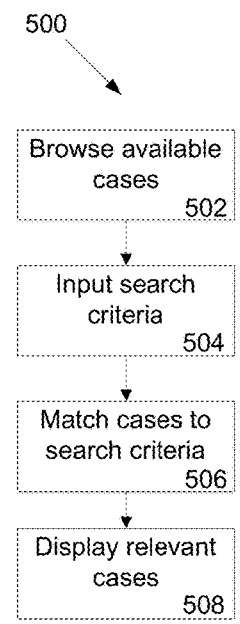
Figure 3                    Figure 4                    Figure 5

SYSTEM AND METHOD FOR CONCEPT DISCOVERY WITH ONLINE INFORMATION ENVIRONMENTS

RELATED APPLICATIONS

This application claims the benefit under 35 U.S.C. § 119 of U.S. Provisional Application No. 61/784,435, entitled "SYSTEM AND METHOD FOR CONCEPT DISCOVERY WITH ONLINE INFORMATION ENVIRONMENTS," filed Mar. 14, 2013, the contents of which are hereby incorporated by reference in their entirety.

BACKGROUND

The phenomenon of like-minded people going online to share ideas, trade, or compete is well-accepted. In moving from the physical world to the digital one, users create virtual "communities" where they are bound together by the similarities of their interests or activities, rather than the proximity of their location. These communities can take any number of forms, the most basic being discussion groups, chat rooms, blogs, and forums, which are, in effect, offline communities reincarnated online.

These online communities can provide powerful sources of information and can also include dynamic creation of information useful both within and outside of these communities.

SUMMARY

Stated broadly, various aspects of the present disclosure relate to improving access to information generated within online communities and improving the generation of information with the online communities. According to one aspect, various intent-based taxonomies are referenced automatically during creation of content which can occur within an online community or in an environment connected to the online community. Referencing intent-based taxonomies during creation of content within the communities provides unique opportunities to classify information as it is being created and to search within existing communities based on matching an intent defined search.

According to another aspect, referencing intent-based taxonomies enables more natural approaches for users to specify problems to be solved, questions to be answered, and other content requests that can be delivered within online communities. In the medical setting, physicians and medical personnel are accustomed to provide medical information and ask questions of other physicians in the form of a narrative. Narrative medical information can be easy for a physician to define but difficult to process in an online community. The inability to classify such narratives can significantly affect the ability of the physician to obtain answers to his/her question and/or search for material in the community based on his/her question. In one embodiment, narrative statements are analyzed automatically and standardized concepts are returned from medical taxonomies that classify a narrative question. Standardized concepts can also be used to search and/or review material relevant to the question defined within a community.

According to some embodiments, medical questions are generated as cases, which organize information on a question, and organize additional information associated with the medical question. Additional case information can also be entered in narrative form, which can also be processed according to identified concepts in medical taxonomies.

Further, intuitive user interfaces are provided that facilitate definition of intent during case generation and case searching. According to one aspect, linking user interface displays and narrative data structures associated with intent information enables definition and navigation of intent-based models of the cases. According to one implementation, the intent-based models reflect standardize concepts (e.g., medical diagnoses and medical concept ontologies) facilitating their navigation based on intent. Further, the intent-based models of cases can include additional close-ended selections to further interact with intent-based models of cases.

It also is realized that conventional online community resources can and do fail to provide answers to question presented within the community. According to one aspect, an active recruitment approach can be executed to ensure answers and interactions occur on a given case and/or question. According to one embodiment, the recruitment approach can be integrated with known or existing online communities to facilitate information exchange and generation. The recruitment approach can be configured to tap resources within an online community but also reach outside of the community to addition resources. According to another embodiment, intent-based models of cases can be used across even language barriers to recruit across the largest knowledge base (e.g., represented by users) possible. Internationally accepted concepts (e.g., SNOMED database) can be used in conjunction with case definition. The resulting case model is configured to be translated through various languages according to the model. Thus the recruitment approach can be augmented by targeting individuals both outside an online community and across languages.

According to one aspect, a system for concept discovery with an online information system is provided. The system comprises at least one processor operatively connect to a memory, the at least one processor configured to execute a plurality of system components from the memory, wherein the system components comprise a user interface configured to accept input in an open-ended text field from a user and an ontology component configured to communicate with an ontology database and match text fragments from the open-ended text field with concepts from the ontology database.

According to one embodiment, the system further comprises an ontology database including terms organized by concept. According to one embodiment, the text fragments include portions of words, single words, or phrases (e.g., "heart att," "col," "albuterol" and "inflammatory arthritis"). According to one embodiment, the ontology component recognizes colloquialisms in the text fragment (e.g., "heart attack") and returns a standard term (e.g., "myocardial infarction"). According to one embodiment, the ontology component disambiguates senses of the same term (e.g., "*staphylococcus*" [organism], "*staphylococcus* toxin" [substance], "*staphylococcus* infection" [disorder], and "*staphylococcus* vaccination" [procedure]). According to one embodiment, the ontology component recognizes acronyms (e.g., M.I.) and returns a complete standard term ("myocardial infarction"). According to one embodiment, the user interface component is configured to display concepts matched by the ontology component to a user. According to one embodiment, the ontology database is the Systemized Nomenclature of Medicine Clinical Terms (SNOMED CT) database.

According to one embodiment, the system further comprises a case database configured to store questions and associated information. According to one embodiment, the questions and associated information are generation from input received from outside the environment. According to one embodiment, the questions and associated information are generated through user interaction with the online information environment. According to one embodiment, the user interface requires input in the open-ended text field from the user to define a case. According to one embodiment, the case database is configured to organize a question and associated information as a case object associated with standardized concepts from the ontology database. According to one embodiment, the case database contains classification information (e.g., patient age, gender, and setting) that further characterizes the unstructured text in the open-ended text field. According to one embodiment, the ontology component accesses the classification information stored in the case database and matches based on at least the text fragment and the classification information (i.e. the system recognizes that the text fragment "col" is more likely matched to "colic" than "colon cancer" for a patient less than one year old).

According to one embodiment, the plurality of system components comprise an aggregation component configured to aggregate information within the case database according to common concepts (e.g., standardized concepts from the SNOMED CT database). According to one embodiment, the system further comprises a search component configured to access the case database. According to one embodiment, the user interface is configured to accept a search narrative as an open-ended text input, and provide concepts from the ontology component to the search component. According to one embodiment, the search component matches concepts from the ontology component to concepts associated with existing cases. According to one embodiment, the ontology component assigns a match grade to each concept matched and ranks the matched concepts based upon the match grade. According to one embodiment, the ontology component determines match grade based at least in part by the number of characters matched from the text fragment with the ontology database concept. According to one embodiment, the ontology component determines match grade at least in part by employing classification information in the case (e.g., age 5-6 increases match grade of pediatric concepts).

According to one aspect, a computer implemented method for concept discover with an online information environment is provided. The method comprises accepting, by a computer system, input into an open-ended text field from a user, communicating, by the computer system, with an ontology database, and matching, by the computer system, text fragments from the open-ended text field with concepts from the ontology database.

According to one embodiment, the method further comprises accessing terms organized by concept from an ontology database. According to one embodiment, matching the text fragments includes recognizing portions of words, single words, or phrases (e.g., "heart att," "col," "albuterol" and "inflammatory arthritis"). According to one embodiment, matching the text fragments includes recognizing colloquialisms in the text fragment (e.g., "heart attack") and returning a standard term (e.g., "myocardial infarction"). According to one embodiment, matching the text fragments includes disambiguating senses of the same term (e.g., "*staphylococcus*" [organism], "*staphylococcus* toxin" [substance], "*staphylococcus* infection" [disorder], and "*staphylococcus* vaccination" [procedure]). According to one embodiment, matching the text fragments includes recognizing acronyms (e.g., M.I.) and returning a complete standard term ("myocardial infarction"). According to one embodiment, the method further comprises displaying concepts matched by the ontology component to a user. According to one embodiment, communicating with the ontology database includes communicating with the Systemized Nomenclature of Medicine Clinical Terms (SNOMED CT) database.

According to one embodiment, the method further comprises communicating with a case database configured to store questions and associated information. According to one embodiment, communicating with the case database includes generating the questions and associated information from input received from outside the environment. According to one embodiment, communicating with the case database includes generating the questions and associated information from input received from the online information environment. According to one embodiment, communicating with the case database includes requiring input in the open-ended text field from the user to define a case. According to one embodiment, the method further comprises organizing question and associated information as a case object in the case database associated with standardized concepts from the ontology database. According to one embodiment, the method further comprises storing classification information (e.g., patient age, gender, and setting) that further characterizes the unstructured text in the open-ended text field in the case database.

According to one embodiment, the method further comprises accessing the classification information stored in the case database and matching based on at least the text fragment and the classification information (i.e. the system recognizes that the text fragment "col" is more likely matched to "colic" than "colon cancer" for a patient less than one year old). According to one embodiment, the method further comprises aggregating information within the case database according to common concepts (e.g., standardized concepts from the SNOMED CT database).

According to one embodiment, the method further comprises searching the case database. According to one embodiment, searching the case database includes accepting a search narrative as an open-ended text input and accessing the ontology database. According to one embodiment, searching the case database includes matching concepts from the ontology database to concepts associated with existing cases. According to one embodiment, the method further comprises assigns a match grade to each concept matched and ranks the matched concepts based upon the match grade. According to one embodiment, the method further comprises determining match grade based at least in part by the number of characters matched from the text fragment with the ontology database concepts. According to one embodiment, the method further comprises determining match grade at least in part by employing classification information in the case (e.g., age 5-6 increases match grade of pediatric concepts).

According to one aspect, a non-transitory computer readable medium containing instruction that when executed cause a computer to system to perform the above methods is provided. Embodiments of the computer readable medium implement each of the method functions above individually and in combination.

According to one aspect, a system interacting with an online information environment is provided. The system comprises at least one processor operatively connect to a memory, the at least one processor configured to execute a plurality of system components from the memory, wherein the system components comprise a user interface configured to accept data, wherein the user interface component is configured to require entry of at least one data parameter, wherein the at least one data parameter includes at least a first open-ended text data parameter and a first close-ended text data parameter among a plurality of data parameters, wherein the user interface component is configured to require entry of at least one data parameter, wherein the at least one data parameter includes at least a first open-ended text data parameter and a first close-ended text data parameter among a plurality of data parameters, wherein the plurality of views comprise at least one of a creation view comprising a plurality of sections in a display, wherein the creation view is configured for creating a case, a response view comprising a plurality of sections in the display, wherein the response view is configured for responding to the case, and a search view comprising a plurality of sections in the display, wherein the search view is configured to match content responsive to data parameters entered by a user.

According to one embodiment, the case is a data object configured to store case information, the case information including at least one of a question, a specialty requirement, and at least one concept. According to one embodiment, the case is a data object configured to store case information, the case information including at least two of a question, a specialty requirement, and at least one concept. According to one embodiment, the case is a data object configured to store case information, the case information including a question, a specialty requirement, and at least one concept.

According to one embodiment, the system further comprises an ontology component, executed by the at least one processor, configured to communicate with an ontology database and match text fragments from open-ended text fields with concepts from the ontology database. According to one embodiment, the user interface component is further configured to display the matched concepts to the user in any of the plurality of views. According to one embodiment, the concepts recognized by the ontology component in any open-ended text field in any of the plurality of views are emphasized (e.g., underlining, display intensity, bold, color, etc.).

According to one embodiment, the creation view includes a first section comprising at least one close-ended data field. According to one embodiment, the at least one close ended data field in the first section of the creation view accepts data into the specialty requirement parameter of the case. According to one embodiment, the creation view includes a second section comprising at least one data field that is configurable between an open-ended data field and a close-ended data field. According to one embodiment, the at least one data field that is configurable between an open-ended data field and a close-ended data field accepts data into the question parameter of the case. According to one embodiment, the response view includes a first section configured to display any of the case information to the user.

According to one embodiment, the user interface component is configured to continuously update a list of cases in a second section of the search view responsive to text input into a first open-ended text parameter in a first section of the search view. According to one embodiment, the search view includes a third section configured to graphically display statistics of the list of cases in the second section of the search view. According to one embodiment, the second section of the search view collapses responsive to user input on a first button in the search view. According to one embodiment, the search view includes a fourth section configured to graphically display the frequency of concepts in the list of cases. According to one embodiment, the list of cases in the second section of the search view is ranked responsive to user input on a second button in the second section of the search view. According to one embodiment, the user interface component is configured to transition from the creation view to the search view responsive to user input. According to one embodiment, the user interface operates on a mobile device. According to one embodiment, the creation view includes a first button that takes a picture through a camera embedded in the mobile device. According to one embodiment, the picture taken through the embedded camera in the mobile device is stored in the case data object.

According to one aspect, a computer implemented method interacting with an online environment is provided. The method comprises requiring, by a computer system, entry of at least one data parameter, the at least one data parameter including at least a first open-ended text data parameter and a first close-ended data parameter among a plurality of data parameters, displaying, by the computer system, a plurality of views configured for entry of the at least one data parameter, wherein displaying the plurality of views includes displaying at least one of a creation view comprising a plurality of sections in a display, wherein the creation view is configured for creating a case, a response view comprising a plurality of sections in the display, wherein the response view is configured for responding to a case, and a search view comprising a plurality of sections in the display, wherein the search view is configured to match content responsive to data parameters entered by a user.

According to one embodiment, the method further comprises storing case information, the case information including at least one of a question, a specialty requirement, and at least one concept. According to one embodiment, the method further comprises storing case information, the case information including at least two of a question, a specialty requirement, and at least one concept. According to one embodiment, the method further comprises storing case information, the case information including a question, a specialty requirement, and at least one concept. According to one embodiment, the method further comprises communicating with an ontology database and matching text fragments from open-ended text fields with concepts from the ontology database. According to one embodiment, the method further comprises displaying the matched concepts to the user in any of the plurality of views. According to one embodiment, the method further comprises emphasizing any matched concept in any open-ended text field in any of the plurality of views (e.g., underlining, display intensity, bold, color, etc.).

According to one embodiment, displaying the creation view includes displaying a first section comprising at least one close-ended data field. According to one embodiment, displaying the creation view includes accepting the specialty requirement parameter of the case in the at least one close ended data field in the first section of the creation view. According to one embodiment, displaying the creation view includes displaying a second section comprising at least one data field that is configurable between an open-ended data field and a close-ended data field. According to one embodiment, displaying the creation view includes accepting the question parameter of the case in the at least one data field that is configurable between an open-ended data field and a close-ended data field. According to one embodiment, displaying the response view includes displaying a first section configured to display any of the case information to the user.

According to one embodiment, displaying the search view includes continuously updating a list of cases in a second section of the search view responsive to text input into a first open-ended text parameter in a first section of the search view. According to one embodiment, displaying the search view includes displaying a third section configured to graphically display statistics of the list of cases in the second section of the search view. According to one embodiment, displaying the second section of the search view includes collapsing the second section responsive to user input on a first button in the search view. According to one embodiment, displaying the search view includes displaying a fourth section configured to graphically display the frequency of concepts in the list of cases. According to one embodiment, displaying the list of cases in the second section of the search view includes ranking the cases responsive to user input on a second button in the second section of the search view. According to one embodiment, displaying the creation view includes transitioning to displaying the search view responsive to user input. According to one embodiment, the method further comprises displaying the plurality of views to the user from a mobile device. According to one embodiment, displaying the creation view includes displaying a first button that takes a picture through a camera embedded in the mobile device. According to one embodiment, the method further comprises storing the picture taken through the embedded camera in the mobile device in the case data object.

According to one aspect, a non-transitory computer readable medium containing instruction that when executed cause a computer to system to perform the above methods is provided. Embodiments of the computer readable medium implement each of the method functions above individually and in combination.

According to one aspect, a system for recruiting participation in an online information environment is provided. The system comprises at least one processor operatively connect to a memory, the at least one processor configured to execute a plurality of system components from the memory, wherein the system components comprise a case component configured to store case information, the case information including at least one of a question, a specialty requirement, and at least one concept, a recruitment component, executed by the at least one processor, configured to access the case information, determine any specialty requirement of the case, access at least one professional network inside the environment and at least one individual outside the environment, wherein the at least one professional network contains a plurality of individuals, determine the specialty of each individual among the plurality of individuals to identify qualified individuals, determine a method of communication with each qualified individual, and deliver a response request to each qualified individual through the determined method of communication.

According to one embodiment, the case information includes at least two of a question, a specialty requirement, and at least one concept. According to one embodiment, the case information includes a question, a specialty requirement, and at least one concept. According to one embodiment, the recruitment component is configured to match the specialty of each individual with the specialty requirement in the case. According to one embodiment, the recruitment component is configured to capture contact information for individuals outside the environment. According to one embodiment, the recruitment component is configured capture specialty information for individuals outside the environment. According to one embodiment, the recruitment component is configured to capture language information from individuals outside the environment. According to one embodiment, the recruitment component is configured to deliver a response request to individuals outside the online environment (e.g., based on matched specialties).

According to one embodiment, at least one of the plurality of professional networks is an online community of users each with a user profile stored in a user profile database (e.g., medical network of physicians). According to one embodiment, the user profile stored in the user profile database comprises at least user specialty information and preferred user communication information. According to one embodiment, the recruitment component is configured to access the user profiles. According to one embodiment, the recruitment component is configured to determine the method of communication with each qualified individual within the online community of users based upon the preferred user communication information. According to one embodiment, the recruitment component is configured to determine the specialty of each individual within the online community of users based upon the user specialty information. According to one embodiment, the user profile database comprises user language information.

According to one embodiment, the system further comprises a translation component, executed by the at least one processor, configured to translate cases from a first language to at least one second language. According to one embodiment, the translation component is configured to extract concepts from the case to generate a concept model. According to one embodiment, the translation component is configured to translate concepts from the concept model. According to one embodiment, the translation component is configured to insert words from the second language into the case. According to one embodiment, the translation component is configured to display the translated case to the user in the at least one second language. According to one embodiment, the recruitment component is configured to deliver a response request for a case stored in the system in the first language from individuals identified as speaking the at least one second language.

According to one aspect, a computer implemented method for recruiting participating in an online information environment is provided. The method comprises storing, by a computer system, case information, the case information including at least one of a question, a specialty requirement, and at least one concept, accessing, by the computer system, the case information, determining, by the computer system, any specialty requirement of the case, accessing, by the computer system, at least one professional network inside the environment and at least one individual outside the environment, wherein the at least one professional network contains a plurality of individuals, determining, by the computer system, the specialty of each individual among the plurality of individuals to identify qualified individuals, determining, by the computer system, a method of communication with each qualified individual, and delivering, by the computer system, a response request to each qualified individual through the determined method of communication.

According to one embodiment, storing the case information includes storing at least two of a question, a specialty requirement, and at least one concept. According to one embodiment, storing the case information includes storing a question, a specialty requirement, and at least one concept. According to one embodiment, determining the specialty includes matching the specialty of each individual with the specialty requirement in the case. According to one embodiment, the method further comprises accessing one individual outside the network includes capturing contact information for individuals outside the environment. According to one embodiment, the method further comprises accessing one individual outside the network includes capturing specialty information for individuals outside the environment. According to one embodiment, the method further comprises accessing one individual outside the network includes capturing information from individuals outside the environment. According to one embodiment, accessing one individual outside the network includes delivering a response request to individuals outside the online environment (e.g., based on matched specialties).

According to one embodiment, accessing the at least one of the plurality of professional networks includes accessing an online community of users each with a user profile stored in a user profile database (e.g., medical network of physicians). According to one embodiment, the method further comprises storing at least user specialty information and preferred user communication information in the user profile. According to one embodiment, accessing the at least one of the plurality of professional networks includes accessing the user profiles. According to one embodiment, determining the method of communication with each qualified individual within the online community of users includes determining the communication method responsive to the preferred user communication information in the user profile. According to one embodiment, determining the specialty of each individual within the online community of users includes determining the specialty of each individual responsive to the user specialty information in the user profile. According to one embodiment, the method further comprises storing user language information in the user profile database.

According to one embodiment, the method further comprises translating cases from a first language to at least one second language. According to one embodiment, translating cases includes extracting concepts from the case to generate a concept model. According to one embodiment, translating cases includes translating concepts from the concept model. According to one embodiment, translating the cases includes inserting words from the second language into the case. According to one embodiment, translating the cases includes displaying the translated case to the user in the at least one second language. According to one embodiment, delivering a response question includes delivering a response request for a case stored in the system in the first language from individuals identified as speaking the at least one second language.

According to one aspect, a non-transitory computer readable medium containing instruction that when executed cause a computer to system to perform the above methods is provided. Embodiments of the computer readable medium implement each of the method functions above individually and in combination.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 3 is a flow chart showing a process for creating a case, according to one embodiment of the present invention;

FIG. 4 is a flow chart showing a process for responding to a case, according to one embodiment of the present invention;

FIG. 5 is a flow chart showing a process for searching and browsing cases, according to one embodiment of the present invention;

DETAILED DESCRIPTION

Figure 1:
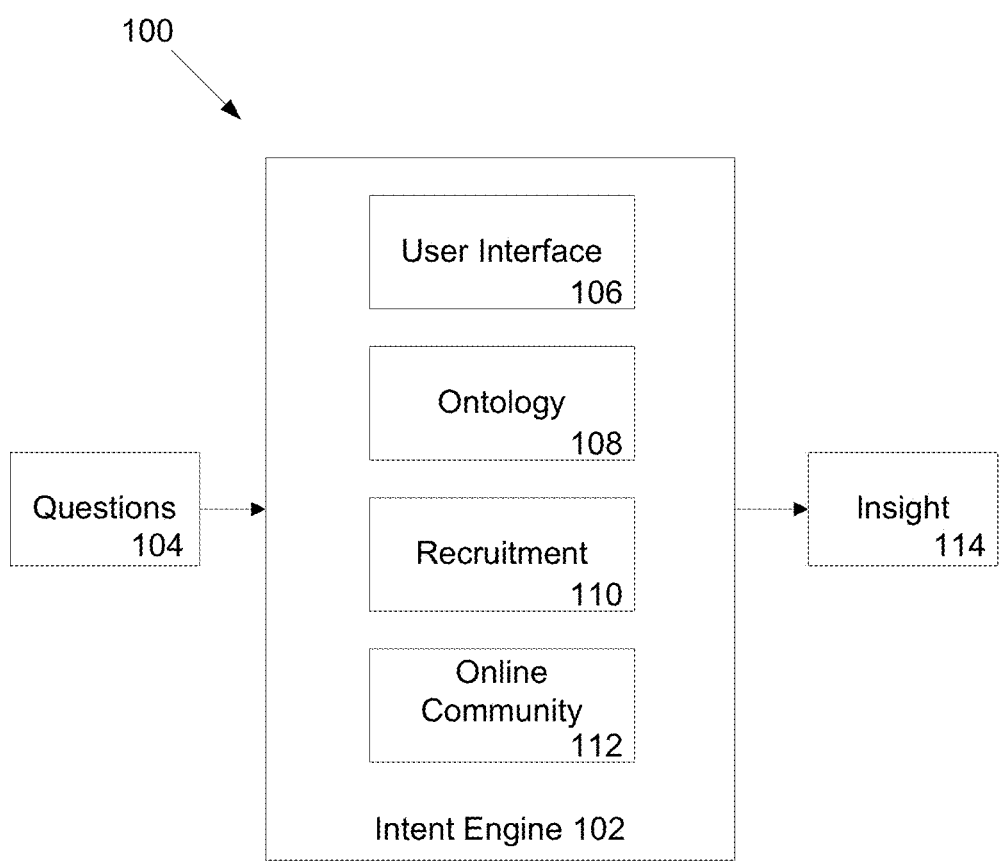
FIG. 1 is a diagram showing a process for interacting with an online system, according to one embodiment of the present invention.

According to one aspect, it is realized that benefits can be obtained by providing users with information targeted to their specific inquiries. One aspect of the present invention is provided by an intent engine (e.g., intent engine 102) executed on a computer system as shown in FIG. 1. The intent engine 102 is configured to accept user inquiries, in the form of a question 104, for example, through a user interface component 106. The question 104 may contain additional supporting information to aid the intent engine 102 in generating an appropriate insight 114 directly related to a user's question. Insight 114 may take the form of answers to a user's specific question generated by individuals within the appropriate field of expertise. In the field of health care, for example, a question may be related to a suggested prescription for a patient with a specific ailment relating to a patient's skin. The insight generated by the intent engine may then take the form of a suggested prescription for the patient generated by a practicing dermatologist.

The intent engine 102 is further configured to leverage information provided by an ontology component 108 to perform a typeahead process for the user while entering text in an open-ended field. The ontology component is configured to organize concepts into a searchable ontology or taxonomy. The ontology component may extract word fragments, entire words, or any combination therein as they are entered to find related concepts in the ontology database. The ontology database may then provide ranked concept suggestions for the user based upon match quality. In the field of health care, for example, the intent engine can be configured to process a question related to a patient's ailment being input as a narrative to find concepts related to the specific ailment and provide suggestions to the user in real time. The ontology component may also match words for the purpose of classifying cases for improved organization and searching.

In one example, the intent engine may then, through a recruitment mechanism 110 recruit individuals for responses to the questions. In one implementation, the recruitment mechanism 110 identifies the appropriate background required for a respondent for a given case and solicits responses. The recruitment mechanism may leverage any online network of professionals to locate users. For example, in the field of health care, the recruitment mechanism may access a network of optometrists to pose a question relating to a patient's eyes. The communication architecture for response solicitation may be customized to fit the specific network being accessed or the preferences of an individual.

In another example, the intent engine may leverage users within an internal online community 112 to generate responses for questions. The online community may be composed of users within a given field and information regarding their respective specialty information. The specialty information related to each user may include their education, occupation, and status as a current practitioner. In the field of health care, the online community may be composed of professionals in the field of medicine. The respective specialty information for each user may contain their sub-discipline within medicine (e.g., Dermatology, Optometry, etc.) including their status as a practitioner (e.g., currently practicing within their given sub-discipline). The online community 112 may provide information to the recruitment mechanism 110 to solicit responses from users within the online community.

In one embodiment, the intent engine operates within an interactive online information environment which may be accessed by one or more computer systems (e.g., Personal Computers (PCs), Portable Digital Assistants (PDAs), telephones, or other computer system types) using various forms of communication (e.g., Internet, cellular network, etc.) to provide individuals with specific information directly pertinent to their needs. The environment is used to generate, aggregate, and filter information between users in the interactive online information environment. In one implementation, a mobile application tool is provided to permit physicians to locate answers to their questions from the physician community in near-real time, based on anonymous case information provided by the physician.

Example Process

Figure 2:
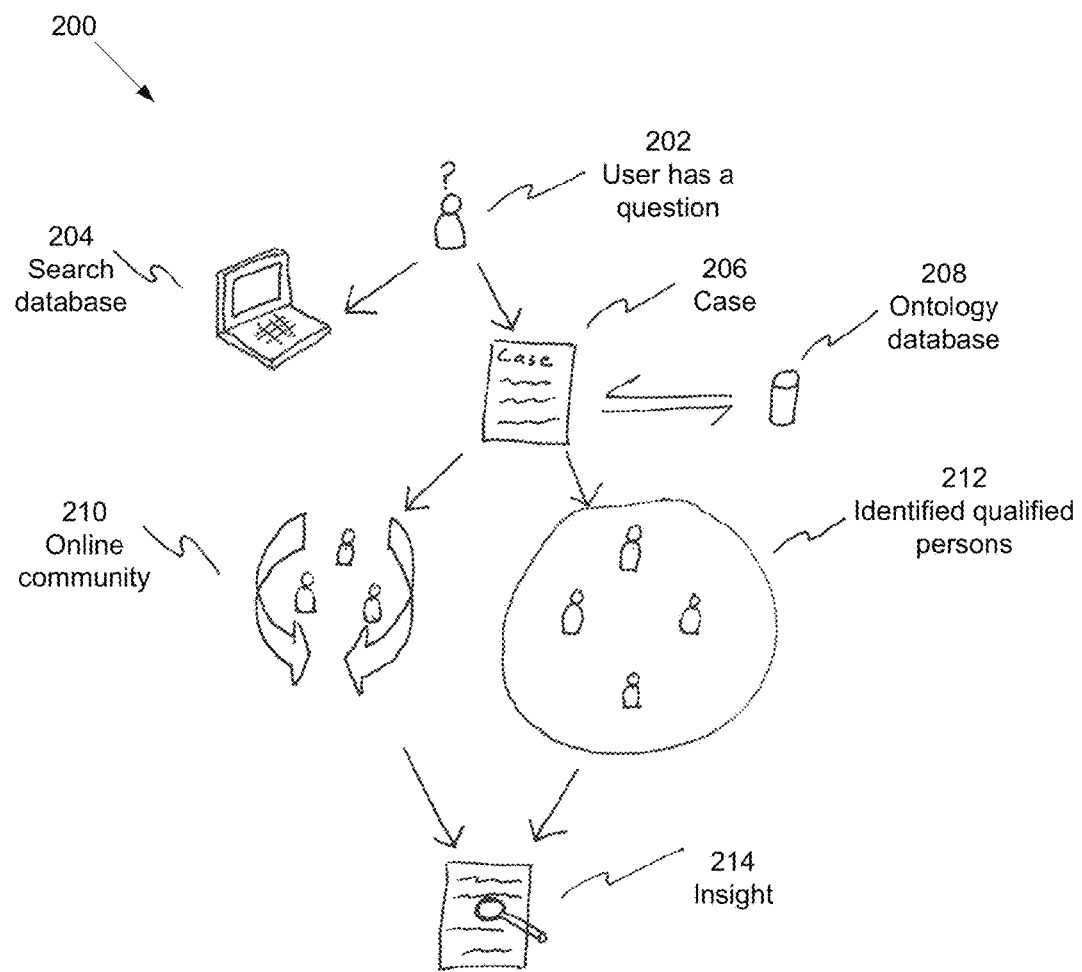
FIG. 2 is a diagram showing a process for generating insights, according to one embodiment of the present invention.

FIG. 2 shows an example process 200 for generating insights directly pertinent to a specific question. The process 200 begins at 202 with a user entering a specific question. According to one embodiment, the entry of the question at 202 begins an interaction with an information environment (e.g., system 100). The information environment provides an online platform for exchanging information between users. In one embodiment, the information environment can facilitate the exchange of medical information. In particular, diagnostic information can be exchanged, discussed and/or evaluated between groups of physicians or other users. The exchanges information can be stored in repositories. The repositories can be referenced in response to a question entered at 202 to determine if an insight is available.

For example, the user may search/browse a database of existing cases 204 in order to find a pertinent insight to his or her question. The database of existing case organizes information developed through the information environment. In the medical setting, the database of existing cases can be specifically organized to facilitate search by medical concepts. In some embodiments, the medical concepts can be provided as external references to medical concept ontologies. In one embodiment, the user may search through an open-text field and/or select specific search criteria (e.g., age of patient) from pre-defined lists accessed in the database at 204. The system can be configured to contain a typeahead component that matches the user's input into the open-text search field with concepts in an ontology database related to the given field of interest. Additionally, the matched concepts may be displayed to the user to help better define the search. The list of cases matched to both the open-text search field and the specific search criteria may be updated continuously as the user enters information. The supplied matched cases may then be ranked based upon the quality of the match.

The user may also create a new case 206 related to the specific question. In one example, the new case can be created through execution of an intent engine 102 on a system 100. The new case 206 may contain close-ended and/or open-ended information relevant to the user's question. The open-ended information may take the form of a narrative and/or pertinent images. Typeahead functionality can also be executed in conjunction with new case definition, for, example, through execution of the ontology component 108 that references an ontology database 208 to identify relevant concepts in the specific field of the question. The system can be configured to provide the relevant concepts to the user through suggestions while the user is entering text into the open-ended fields in the case to assist the user in better defining their question. In addition, the user initiating the case may select restriction criteria for the respondents based upon their specialty information. The case 206 may then be posed to the online community 210 within the environment. The system can be configured to recruit individuals through a recruitment mechanism 110 executed by the intent engine. The system can be configured to leverage individuals from both inside and outside the online community that meet the specialty criteria set forth by the initiating user for the case. Individuals may be incentivized to respond to the case by the system. The incentives provided for a given case need not be static; they can change as parameters associated with the case change (e.g., number of responses, time since last response, etc.).

Individuals who meet the specialty requirements of the case, referred to as qualified individuals, may respond to the case through multiple methods. Qualified individuals may submit their own responses to the case, submit comments to previously submitted responses, or vote on previously submitted responses. Voting on a response may take the form of an "up-vote" to add credibility to the response to a "down-vote" to reduce the credibility of the response. The responses submitted may then be ranked based upon utility and provided as insight to the user who initiated the case.

As described above, a user may create a case to generate question specific insight. FIG. 3 shows an example flowchart showing an example process 300 for creating a case according to one embodiment. The process 300 begins at 302, with creation of a case. In one example, a user with a specific question may create a case 302. Definition of a case at 302 can include displaying case parameters to the user. In some examples, the user can be requested to provide data in forms displayed to the users associated with specific data fields. For example, a case may contain supporting information in the form of open-ended parameters and/or close-ended parameters. The open-ended parameters may include a narrative field allowing the user to describe their question. The close-ended parameters may include generic classification items related to the type of question in addition to specific criteria relating to the restriction criteria to focus the specialty areas of the respondents. In one example for a health care setting, the cases are implemented in the field of health care. The open-ended parameters may include a "chief complaint" or "CC" of the user along with an associated question such as "what should I prescribe?" or "what is the appropriate diagnosis?" In the field of health care, for example, the system can be configured to also include the open-ended parameter "history of present illness" or "HPI." The close-ended parameters associated with the case may include patient age, gender, and setting.

Definition of a case at 302 can include processing of word fragments within the open-ended parameters, such as the narrative fields. In one example, definition of the case at 302 includes operations for matching concepts from an ontology database with the word fragments. As the word fragments are entered and processed the match concepts can be displayed to the user to achieve typeahead functionality. One embodiment of typeahead functions is described below with reference FIG. 6 (and shown in Display 1220 of FIG. 12B).

The matched terms in the narrative fields generated at 302 may be stored with the case as "tags" used to further classify the case as part of 302. The tags in addition to the close-ended parameters may be used to find related cases 304 to display to the user. According to one embodiment, as the user types a question defining at least some information on the case matching concepts can be delivered and the combined information can be used to search for related cases at 304. In one embodiment, matching concepts can be refined and delivered to the user in real time as part of 302. Additionally, related cases can be refined and delivered to the user as concept matches are refined and deliver, enabling more refined searches to match related cases as the user's intent becomes better defined. The related cases may be updated continuously in a case repository throughout the case creation process. Any updates to the case repository can likewise be presented to the user as to mitigate duplication in the system.

Once pertinent information has be defined for the case at 302, and any potential matches have been delivered at 304, the new case can be submitted at 306. In one embodiment, a user enters information at 302, reviewed related cases at 304, and submits the new case at 306 to the system. In response to a new case submission, process 300 can continue at 308 with recruiting responders.

In one example, the system can be configured to recruitment individuals to get responses to the new case at 308. The system can be configured to leverage an online community within the environment and/or recruit individuals from outside the environment in related professional networks to respond to the case. The act of recruiting at 308 can include accessing the qualifications of candidate responders. In one embodiment, accessing the qualifications of candidate responders includes determining qualifications for individual candidate responders and matching their qualifications to the specialty requirements forth in the case. According to one embodiment, inside the online community, user information may be accessed to further determine the best method of solicitation for each user (e.g., email or text message). Execution of step 308 can include execution of additional processes. For example, recruitment at 308 can include execution of a sub-process, instantiation of other processes, which match recruitment criteria to specific responders. The specific responders can be identified and returned by the sub-processes at part of 308. In one example, a recruitment sub-process, mechanisms, and/or functionality is described below with respect to process 800, FIG. 8.

After responses directly relevant to the case have been received, the system can be configured to further assign a "score" or utility rating to each response for the purpose of ranking the responses 310. The score may be determined in part by the ranking of the user who submitted the response within the community. The system can be configured to track the history of each user within the online community and assign each user a rank based upon their interactions within the online community. A user's rank may increase by providing valuable responses to cases while a user's rank may decrease by providing poor responses to cases. In addition, the score of a response may also be determined in part by the number of "up-votes" relative to the number of "down-votes" submitted for the given response by other users. "Up-votes" submitted by users represent a user commenting "I concur" with the response while down votes submitted by users represent a user commenting "I disagree" with the response.

The user who submitted the case may then review the ranked cases 312 and determine an appropriate action. In reviewing the responses, the user may submit their final action based upon the responses and the action's associated outcome for the general knowledge users within the environment. In a health care application, the user who submitted the question may give a patient a prescription based upon responses to their inquiry. The user who submitted the question may then post comments relating to the efficacy of the prescription to better educate users within the online community.

The system can be configured to enable individuals to respond to cases in order to generate new insight relative to a question. FIG. 4 shows an example flowchart showing an example process 400 for responding to cases according to one embodiment. The process 400 begins at 402, with execution of a search on a database. In one embodiment, an online information system provides access to a database for medical insights. A user within the online community may search the case database 402 to identify cases of interest at 404. The system can be configured to monitor case entry/updates through at the database (e.g., at 402) and optionally send notifications to a user including cases of interest, for example, determined by their history of interaction with the system or preferences associated with their profile in the online community. According to one embodiment, the system can be configured to store a profile for each user within the community that contains information relating to the user. In one example, the user profile can include their interests and preferred communication methods. The system can be configured to tailor case notifications and subsequent case update notification methods used to contact the user based upon information within their profile in the online community.

Once a user has identified a case of interest (e.g., 404), or received a notification relating to a case from the system, the user may submit a response 408 or add an additional comment to a pre-existing response to further define the response. The response may include a narrative response in an open-ended parameter field. In some embodiments, the system provides a user interface including a typeahead functionality to assist the respondent in defining the response. One embodiment of typeahead functionality is described below with reference FIG. 6 (and shown in Display 1220 of FIG. 12B). The typeahead functionality can facilitate concept identification within responses similarly to entry of cases. Consistent concept identification facilitates generation of content within the system that is readily and consistently searchable.

According to one embodiment, the system can be configured to solicit responses from individuals outside the system (i.e. from other professional networks) by transforming the case into a survey. In one example, the system is configured to generate a survey from information contained in the case and in particular any question being asked. The system can target such surveys to users outside of the network, outside of the online information system, etc. In response to receiving a survey, the individual may then submit a response to the survey in a similar fashion to a user within the online community. In one example, the survey is delivered electronically. The survey can contain links to answers and/or voting options that upon selection will automatically deliver the individuals answer and/or vote. In other examples, the survey can contain access information (including, for example, access credentials) that allow access to a case on the system.

The system can be configured to allow the user to vote on an existing response 406 through either up-voting a response or down-voting a response. Up-voting a response may increase the utility score associated with the response and increase its ranking among a plurality of responses submitted to a case. Down-voting a response may decrease the score associated with the response and decrease its ranking among a plurality of responses submitted to a case. The system can be configured to analyze the composition of votes, up-votes and down-votes, and alter the ranking of the respondent within the online community. The user may also flag a response for further review by other users or administrators (e.g., moderators) within the environment.

In another example, the online community may have a discussion forum that enables users to discuss topics online. In this example, the system can be configured to enable a user to generate a related discussion forum 410 to further discuss the finer points of the case and subsequent responses.

In addition to case creation and response generation, user may have the option to search or browse the existing cases. FIG. 5 shows an example flowchart showing an example process 500 for searching and browsing cases according to one embodiment. The process 500 begins at 502, with displaying a list of cases. In one example, a user within the environment may browse or search displayed cases at 502. According to one embodiment, the user may select close-ended parameters or enter text into an open-ended parameter, such as a search field, as input into the search to refine the list of entries displayed to the user. The system can be configured to continuously update the list of cases displayed to the user as additional search criteria are selected or entered. The open-ended parameter field in the search may include typeahead functionality where the system references an ontology database to provide suggestions to the user. One embodiment of typeahead functions is described below with reference FIG. 6 (and shown in Display 1220 of FIG. 12B). In addition, the system can be configured to display the matched concepts labeled as tags and used as an additional means of locating similar records within the database, for example, as shown in Display 1422 of FIG. 14B.

The system can be configured to match the cases 506 based on all of the entered search criteria. The cases may then be ranked based upon the quality of the match. In one example, the quality of the match may be based on the number of matched tags and classification information items. The ranked cases may then be displayed at 508 to the user in addition to statistics relating to the returned cases from the query as shown in Display 1408 of FIG. 14A. Execution of step 506 can include execution of additional processes. For example, matching at 506 can include execution of a sub-process, instantiation of other processes, which translate cases within the case database from foreign languages to a preferred language for the viewing user. The cases to be translated can be identified, translated, and returned by the sub-processes at part of 506. In one example, a translation sub-process, mechanisms, and/or functionality is described below with respect to process 900, FIG. 9.

Figure 6:
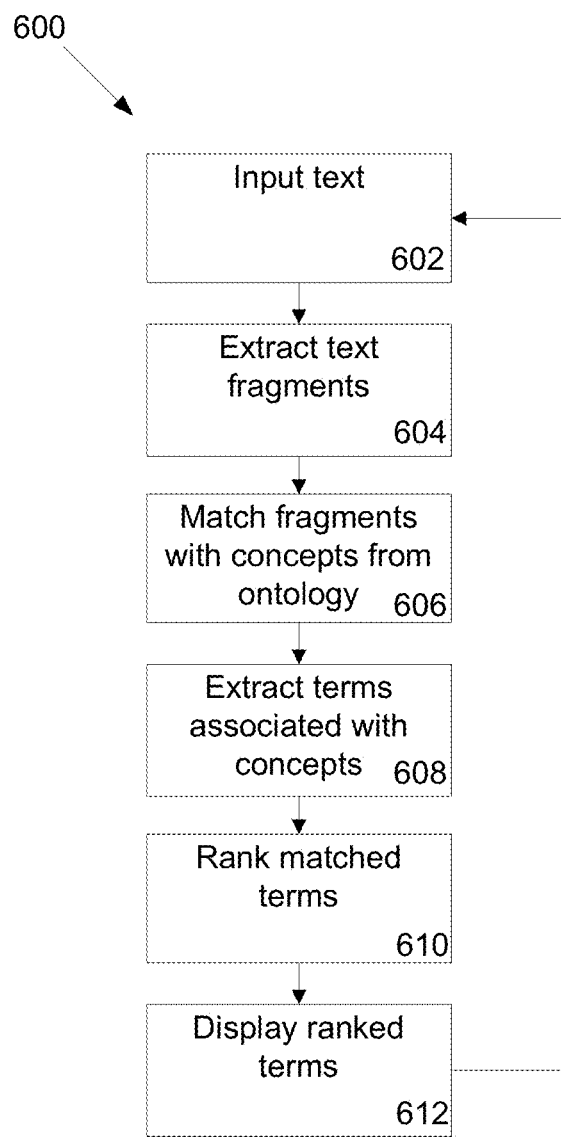
FIG. 6 is a flow chart showing a process for implementing typeahead functionality, according to one embodiment of the present invention.

The system can be configured to contain therein a typeahead feature to assist users throughout the case creation, search, and response processes. FIG. 6 shows an example flowchart showing an example process 600 for implementing typeahead functionality in one embodiment. The process 600 begins at 602, with text input. According to one embodiment, the text input is received from an open-ended field parameter displayed in a search interface. In one example, a user inputs text into an open-ended text parameter field at 602. The text fragments may be extracted from the open-ended text parameter field while the user is typing into the field 604. The text fragments may include entire words, phrases, or sections of words. The system selects text fragments to analyze based upon their contextual relevance to the case. In the field of health care, for example, a user may enter the following narrative in an open-ended field, "a 35 y/o male with HLA B27-positive inflammatory arthritis." They system can be configured to match the phrases "HLA B27-positive" and "inflammatory arthritis" rather than trying to match other words that are not contextually relevant such as "a" or "with."

The text fragments extracted from the open-ended field may then be matched with an ontology database to find matching concepts 606 pertinent to the specific field of the question. The text fragments recognized by the system for the purpose of matching to an ontology database may include acronyms, colloquial terms, synonyms, and any combination thereof. The list of matched concepts may then be ranked based upon the degree of string match or frequency of the concept in the ontology database 608. The system can be configured to also utilize close-ended parameters or other classification tags to improve the quality of the return matches.

In the field of health care, for example, the ontology database may be the Systemized Nomenclature of Medicine Clinical Terms (SNOMED CT) database. The system can be configured to utilize the close-ended parameter age associated with a case to improve the quality of the returned typeahead matches. For example, the system can be configured to recognize that a user typed "col" relating to a patient under the age of one year. The system can be configured to recognize that there is a higher probability that "colic" is the intended concept rather than "colon cancer." In another example in the field of health care, a user may enter a synonym or colloquial term relative to the established ontology database such as the phrase "heart attack." The system can be configured to match "heart attack" with the corresponding term "myocardial infarction" in the SNOMED CT database.

In one embodiment relating to the field of health care, the system can be configured to re-evaluate medical disclosure in a variety of environments to classify generated content. One example, the generated content can be classified according to concepts. In another example, concept discovery executed by the system can recognize the phrases "male" and "35 y/o" in the narrative "a 35 y/o male with HLA B27-positive inflammatory arthritis" from existing content. The existing content may be modeled into open-ended and close-ended data structures. For example, the data structures may include classification fields relating to the patient gender and age can be populated by the system with the appropriate information (patient gender: "male" and patient age: "35"). In another embodiment, the system can be configured to generate an entire case, including case classification information, from existing content (e.g., any narrative). The source data narratives can be obtained from another existing environment. Another existing environment that can be used as an information source to generate cases is described in commonly owned U.S. Pat. No. 8,239,240, included as Appendix A. Appendix A forms an instant part of this Specification.

In addition, the system can be configured to make suggestions to the user to disambiguate terms in a given field in process 608. In the field of medicine, for example, the term "staphylococcus" could be referring to the "staphylococcus" organism, the substance "staphylococcus toxin", the disorder "staphylococcus infection", or the procedure "staphylococcus vaccination." The system can be configured to pose all of the aforementioned items relating to "staphylococcus" as suggestions to the user to help clarify their input text.

After the system has determined the list of matching terms in process 608, the system can be configured to rank the terms in process 610. The terms may be ranked based on the number of words matched in a phrase or the number of close-ended parameters matched with the concept. The list of ranked suggestions may be displayed to the user in process 612 and continuously updated as the user continues to enter text. An illustration of the suggestions displayed to the user may be seen in Display 1220 of FIG. 12B.

Figure 7:
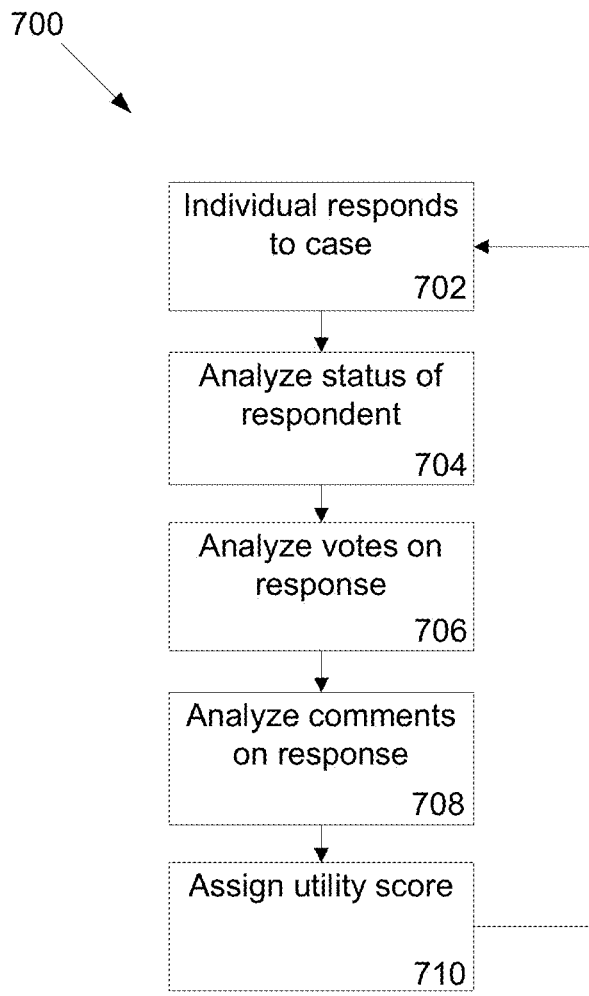
FIG. 7 is a flow chart showing a process for ranking responses, according to one embodiment of the present invention.

The system can be configured to employ a response ranking process to further assist the user discover concepts stored in the online community. FIG. 7 shows an example flowchart showing an example process 700 for ranking responses in one embodiment. The process begins at 702, with receiving a case response. An individual may respond to a case through multiple methods at 702 as discussed in detail above (e.g., in process 400 of FIG. 4). The system can be configured to analyze the status or ranking of the respondent at 704, if the respondent is from within the online community. The status or ranking of each member in the online community may be stored in their respective online profile. The ranking of a member in the online community may be determined, for example, by the length of time a member has been active within the online community, level of education relating to their specialty, or time spent as a practitioner within their specialty. Similar metrics may be analyzed from respondents recruited by the system from professional networks outside the system. The ranking of a respondent associated with a response may be displayed to the user through the user interface (e.g., Display 1360C of FIG. 13).

The system can be configured to also analyze the composition of votes related to each response at 706. An individual responding to a case may optionally submit an up-vote or down-vote with respect to each response. The analysis process may include subtracting the number of down-votes from the number of up-votes received on a response in order to get an aggregate vote count. The aggregate vote count may be displayed to the user through the user interface as seen in Display 1320B of FIG. 13. The comments submitted by other individuals with respect to a specific response may also be analyzed at 708. For example, the number of comments on a specific response may be determined. Each of the analyzed features may yield a numeric value that can be incorporated into a weighted average to determine a final utility score assigned to the response 710.

Figure 8:
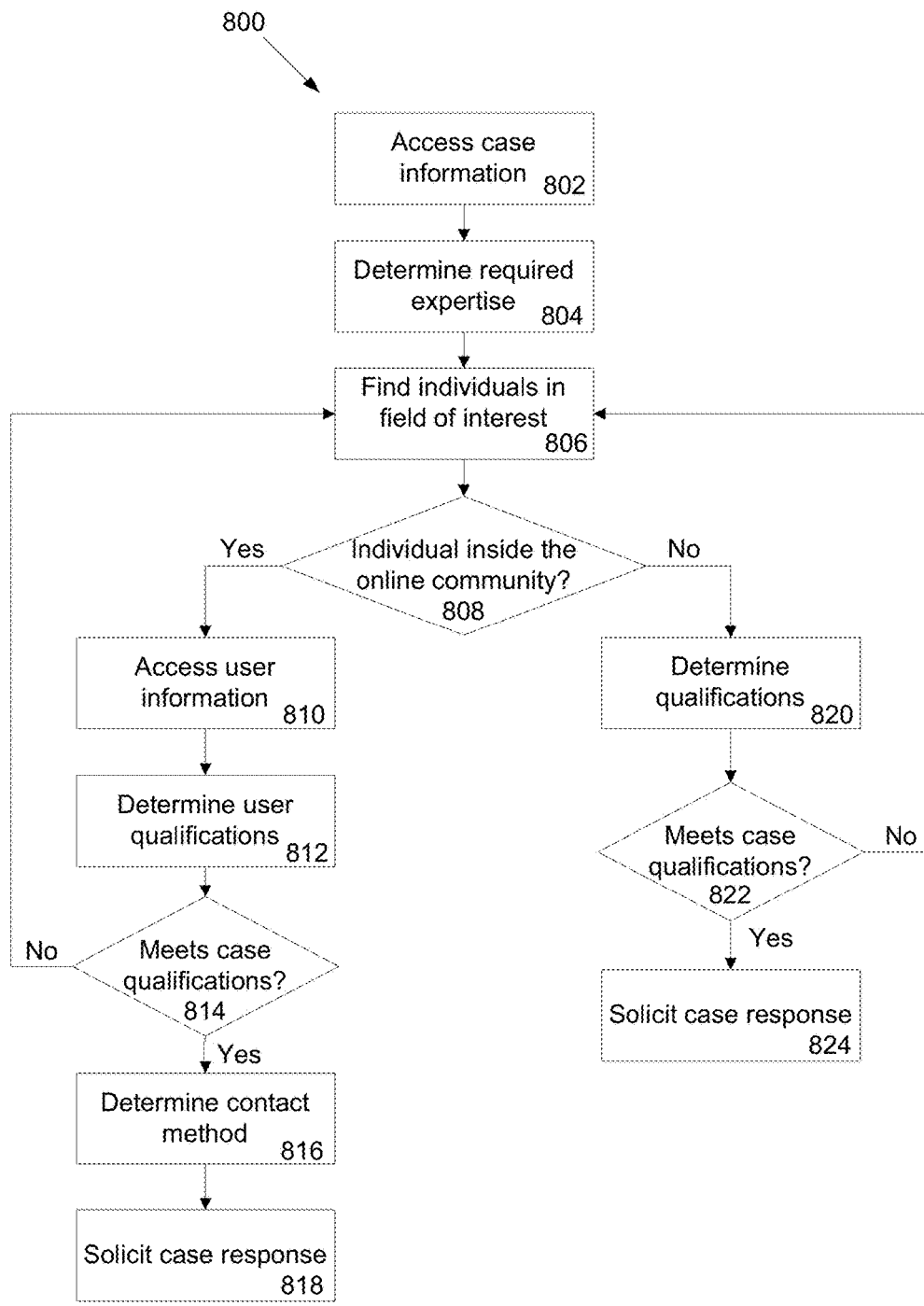
FIG. 8 is a flow chart showing a process for soliciting responses for cases, according to one embodiment of the present invention.

As discussed, various types of responses can be analyzed to determined utility. In some embodiments, responses can be actively solicited and its utility scored. FIG. 8 shows an example flowchart showing an example process 800 for soliciting responses for cases in one embodiment. The process begins at 802, with accessing case information. The system can be configured to access case information at 802 to determine what specialty requirements were created by the case creator at 804. The case information may also be used to determine the duration that the case has been unanswered or time after the last response to access the urgency of responses needed for the case. The system can be configured to recruit users both inside and outside the online community at 806 that are in the generic field of interest to the case (e.g., health care professionals). Resources that exist outside the online community may include networks of professionals in the field pertinent to the case. The system will then determine whether each individual is inside or outside the community at 808 and apply a recruitment process based upon their community affiliation.

If it is determined that a user is within the online community, the system can be configured to leverage the information stored in the user's profile within the system at 810. The qualifications of the specific user may be determined if they have the appropriate specialty (e.g., Optometrist) required for the case at 812. If the user meets the specialty requirements of the case, the system can be configured to determine the appropriate method to solicit a response from the user at 818. The appropriate method may be determined by accessing communication preference information of the user from their profile. The system can be configured to solicit a response for the case from the user at 818 based upon their preferences.

If it is determined that an individual is outside the online community, the system can be configured to communicate with the outside network to determine the specialty of the individual within the outside network. The qualifications received from the outside network may then be compared with the requirements set forth in the case at 822. If the individual from outside the network meets the specialty requirements of the case, the system can be configured to solicit a response. The system can be configured to customize the solicitation method for each professional network. In the field of health care, for example, the system can be configured to communicate with a network of doctors of a single specialty who participate in various health care related surveys. The system can be configured to pose the case in the form of a survey to individuals within the outside network to solicit a response.

Figure 9:
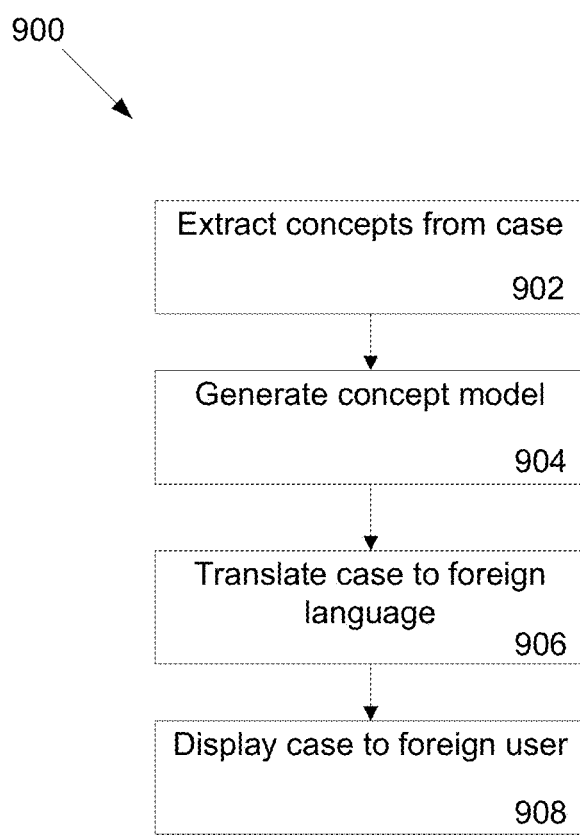
FIG. 9 is a flow chart showing a process for translating cases, according to one embodiment of the present invention.

Recruitment operations can benefit from translation processes as recruitment may be performed both inside and outside in the environment but also across language boundaries. FIG. 9 shows an example flowchart showing an example process 900 for translating cases according to one embodiment. The process begins at 902, with extracting concepts from the case. Concepts from the case, in the form of associated tags or close-ended parameters, may be extracted from a case at 902. The concepts can be derived from a concept taxonomy, and in particular, the SNOMED CT database. The extracted concepts may be used to generate a concept model at 904. The concept model is an abstract model of the case and its corresponding information that captures the contextually relevant concepts from both the question and any responses. In one example, the concept model is design to include internationally recognized concepts (e.g., medical concepts from the SNOMED CT database). The concept model may then be used as the basis with which to translate the case into a foreign language at 906. The process 906 may include the direct translation of terms in from the concept model associated with the close-ended parameters and tags. In addition, words may be inserted following the direct translation of the concept model terms to form a coherent case and subsequent list of responses to display to a user. The translated case may then be displayed to the foreign user at 908.

General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system can be configured to facilitate an online environment according to various embodiments of the invention. Further, the system may be located on a single computer or may be distributed among a plurality of computers attached by a communications network.

A general-purpose computer system according to one embodiment of the invention is configured to perform any of the described functions, including but not limited to, creating, storing, and receiving votes on cases by/from users and bidding on cases by information consumers. It should be appreciated that the system can be configured to perform other functions, including paying users, receiving payments from information consumers, providing indications to users and consumers, etc., and the invention is not limited to having any particular function or set of functions.

Figure 10:
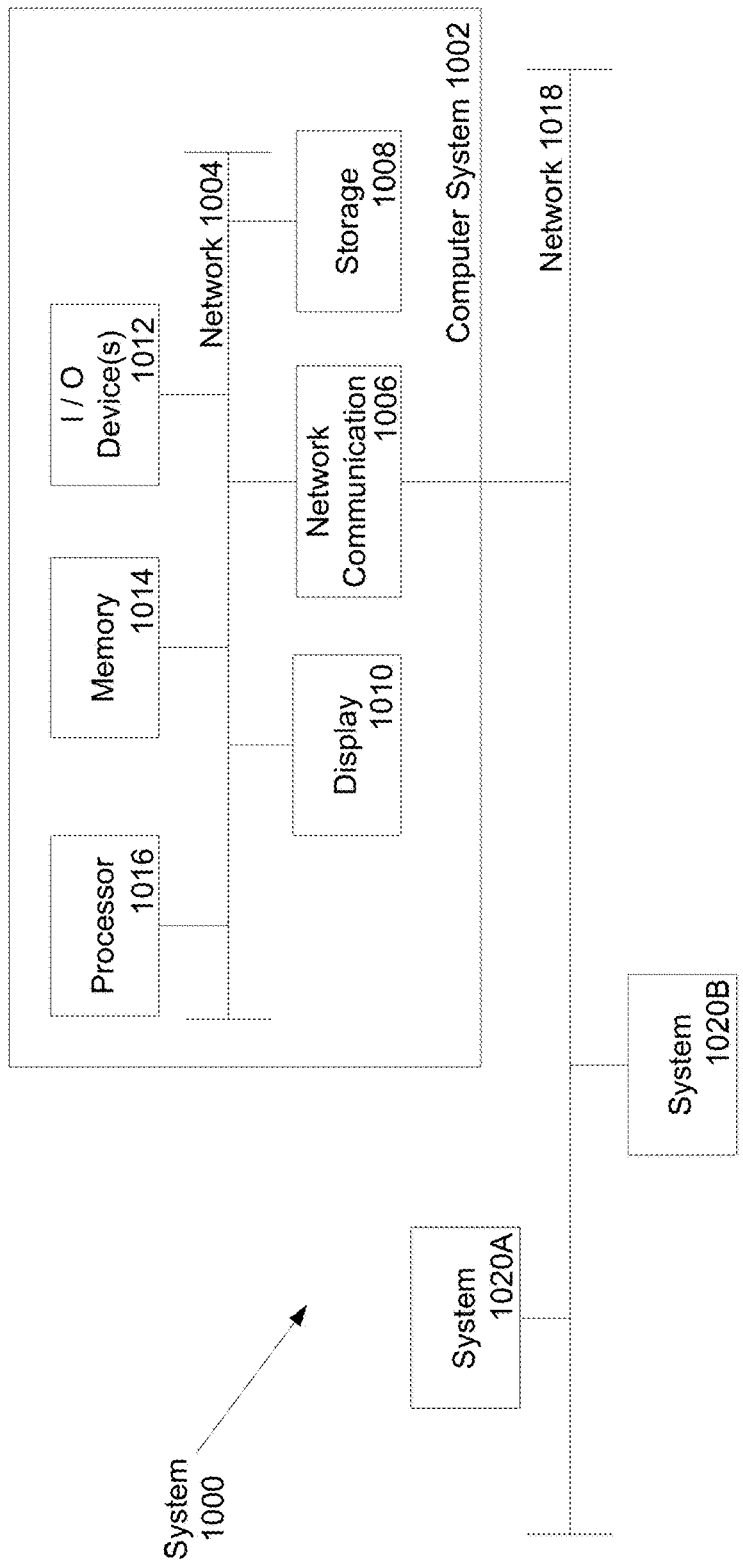
FIG. 10 is a block diagram of a general-purpose computer system upon which various embodiments of the invention may be implemented.

FIG. 10 shows a block diagram of a general purpose computer and network system 1000 in which various aspects of the present invention may be practiced. For example, various aspects of the invention may be implemented as specialized software executing in one or more computer systems including general-purpose computer system 1002 shown in FIG. 10. Computer system 1002 may include a processor 1016 connected to one or more memory devices 1014, such as a disk drive, memory, or other device for storing data. Memory 1014 is typically used for storing programs and data during operation of the computer system 1002. Components of computer system 1002 may be coupled by an interconnection mechanism such as network 1004, which may include one or more busses (e.g., between components that are integrated within a same machine) and/or a network (e.g., between components that reside on separate discrete machines). The interconnection mechanism enables communications (e.g., data, instructions) to be exchanged between system components of system 1002. Computer system 1002 also includes one or more input/output (I/O) devices 1012, for example, a keyboard, mouse, trackball, microphone, touch screen, a printing device, display screen, speaker, etc. In addition, computer system 1002 may contain one or more interfaces (e.g., network communication device 1006) that connect computer system 1002 to a communication network (in addition or as an alternative to the network 1002).

The storage system 1008, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 1008, as shown, or in memory system 1014. The processor 1016 generally manipulates the data within the memory 1014, and then copies the data to the medium associated with storage 1008 after processing is completed. A variety of mechanisms are known for managing data movement between the medium and integrated circuit memory element and the invention is not limited thereto. The invention is not limited to a particular memory system or storage system. The computer system can be configured to include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1002 is shown by way of example as one type of computer system upon which various aspects of the invention may be practiced, it should be appreciated that aspects of the invention are not limited to being implemented on the computer system as shown in FIG. 10. Various aspects of the invention may be practiced on one or more computers having a different architectures or components that that shown in FIG. 10. Computer system 1002 may be a general-purpose computer system that is programmable using a high-level computer programming language. Computer system 1002 may be also implemented using specially programmed, special purpose hardware. In computer system 1002, processor 1016 is typically a commercially available processor such as the well-known Pentium class processor available from the Intel Corporation. Many other processors are available. Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 1000. For instance, the system may be a distributed system (e.g., client server, multi-tier system). In one example, the system includes software processes executing on a system associated with a user (e.g., a client system). These systems may permit the user to create, submit, view, search, and vote on cases within an online environment.

Example System Architecture

Figure 11:
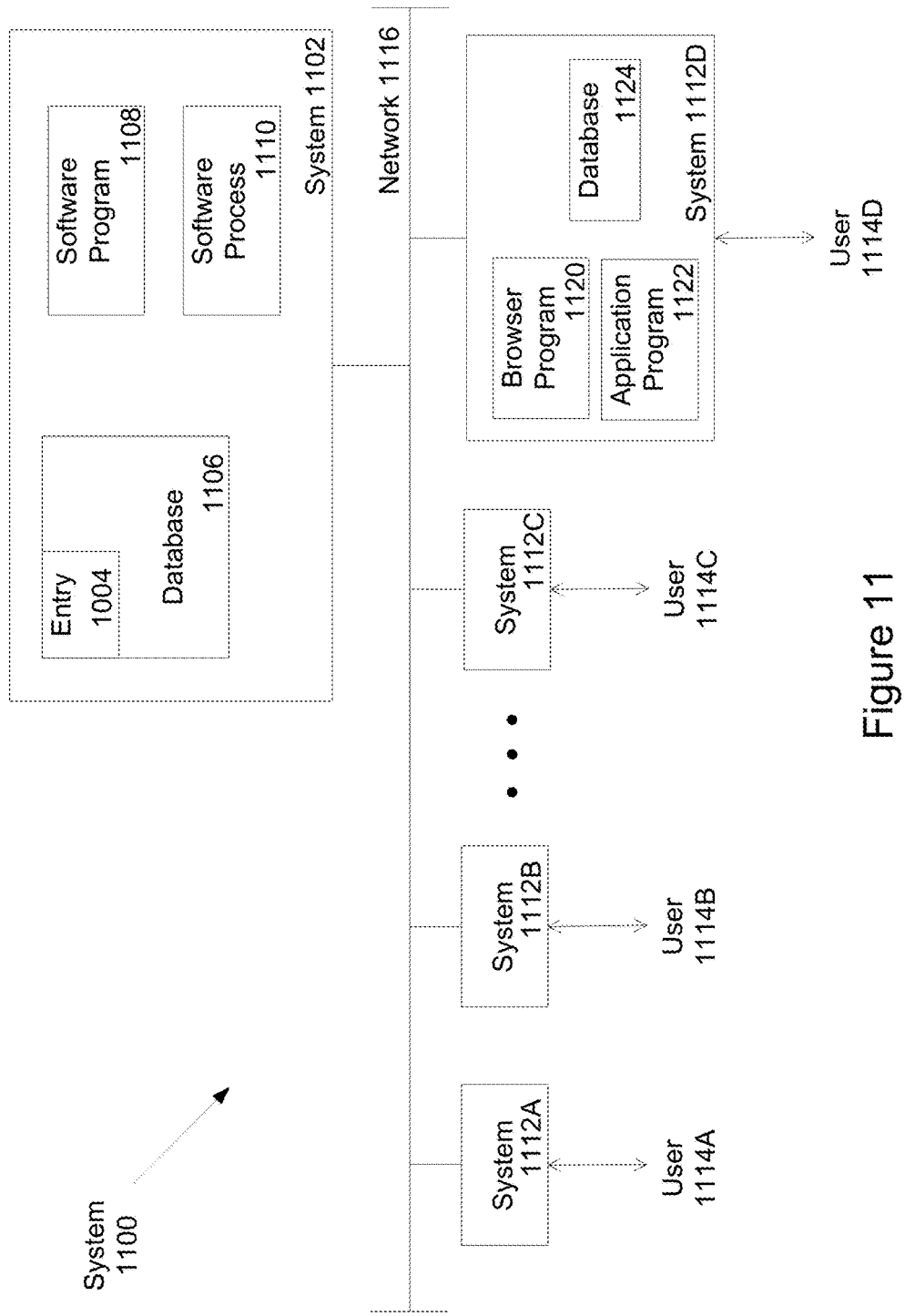
FIG. 11 is a block diagram of a distributed computer system with which various embodiments of the invention may be practiced.

FIG. 11 shows an architecture diagram of an example system according to one embodiment of the invention. It should be appreciated that FIG. 11 is provided for illustration purposes only, and that other architectures may be used to facilitate one or more aspects of the present invention.

As shown in FIG. 11, a distributed system 1100 may be used to conduct functions of the environment, including, but limited to, the creation of cases, storing case information, determining and storing tag information associated with cases, performing voting actions, and storing user information. System 1100 may include one or more computer systems (e.g., systems 1102, 1114A-D) coupled by a communication network 1116. Such computer systems may be, for example, general-purpose computer systems as discussed above with reference to FIG. 10.

In one embodiment of the present invention, system 1102 stores user question information in the form of a case in one or more databases (e.g., database 1106). Further, system 1102 performs associated functions with the user question information and its associated case. System 1102 may include a server process (e.g., process 1110) that responds to requests from one or more client programs. Process 1110 may include, for example, an HTTP server or other server-based process (e.g., a database server process, XML server, peer-to-peer process) that interfaces to one or more client programs distributed among one or more client systems (e.g., systems 1114A-1114D).

According to one embodiment, client programs may be capable of permitting a user to create, submit, view, search, comment, respond and vote on cases within an online environment. Such client programs may include, for example, any type of operating system and/or application program capable of communicating with system 1102 through network 1116. In one particular instance, a client may include a browser program (e.g., browser program 1120) that communicates with server process 1110 using one or more communication protocols (e.g., HTTP over a TCP/IP-based network, XML requests using HTTP through an Ajax client process, distributed objects, etc.).

Although it is shown by way of example that a browser program may be used to access the environment by users to perform environment functions, it should be appreciated that other program types may be used to interface a user to server process 1110. For instance, an application program that is specially-developed to manage case data may be provided to permit a user to perform environment functions according to various embodiments of the present invention. The client program may be, for example, a thin client including an interface for managing case data. Alternatively, the client may be a scripted program, or any other type of program having the capability of transferring case data. According to one embodiment, such client programs may, for example, be downloaded and installed over the network. Further, these client programs may be stored and distributed by system 1102 in the form of one or more software programs 1108.

In one specific example, the client program may include an application program 1122 that permits the user to create, submit, view, search, and vote on cases within an online environment. This program 1122, in one embodiment, may be integrated with browser program 1120 executing on system 1112D. For instance, the application program 1122 may include one or more controls that, when selected by the user, perform functions for manipulating case information. These controls may be written in a variety of programming languages, and the invention is not limited to any particular language. In one specific example, the control may be a link that, when selected, performs one or more programmed functions. Such functions may permit the user to create, submit, view, search, and vote on cases within an online environment.

Information stored in the database 1106 may include, for example, case information including, but not limited to, a unique case identifier, a timestamp, a reference ID of the case creator, close-ended case description parameters (e.g., age of patient, sex of patient, treatment setting, etc.), close-ended specialty requirements parameter, close-ended type of question parameter, a chief complaint or brief question open-ended parameter, an additional detail open-ended parameter, a list of tags classifying the case, a case utility score, and a flag. In addition, the database 1106 may further include, for example, case response information including, but not limited to, a case identifier, a reference ID of the respondent, type of response close-ended parameter, a response open-ended parameter, a timestamp, a list of tags classifying the response, a response utility score, and a flag. The database 1106 may further include, for example, user profile information including, but not limited to, a user reference ID, a specialty close-ended parameter, a user ranking, a screen identifier, and user preference parameters (e.g., how frequently to be contacted, preferred topics, user's use history etc.).

This information may be collected from the user in an interface (e.g., as presented by program 1122) and stored in the database (e.g., database 1106). Additionally, client systems may store a local copy of a user's case information within a local database associated with the client system (e.g., database 1106 located on client system 1112D). However, it should be appreciated that the invention is not limited to storing case and/or user information in any particular location. A client system (e.g., clients 1112A-1112D) may include one or more interfaces through which case information may be presented to the user. In one example, case information and status may be presented in an interface of a browser program (e.g., browser program 1120) executing on a client computer system (e.g., system 1112D).

User Interfaces

Figure 12A:
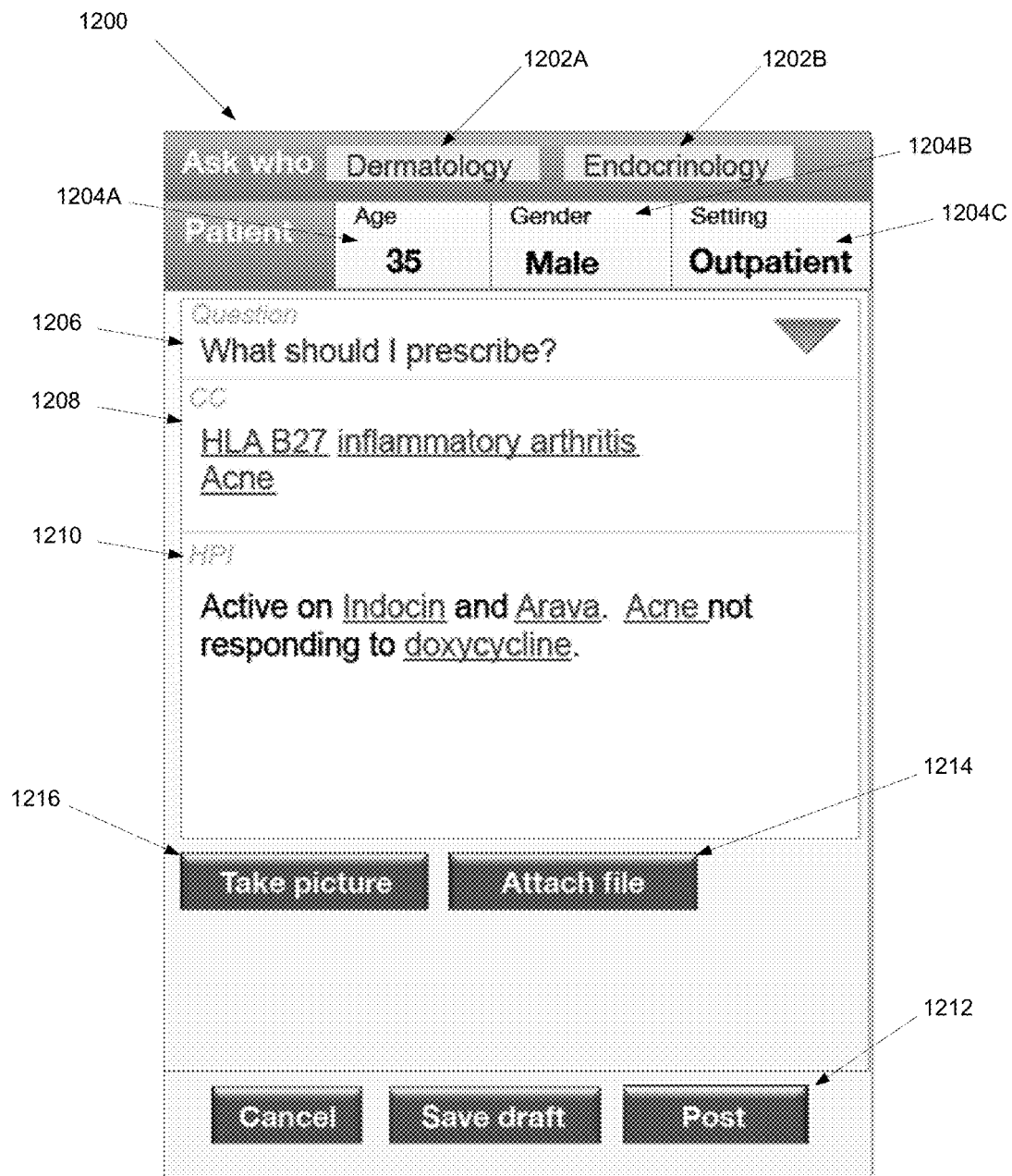
FIGS. 12A-B are diagrams showing example interfaces according to various embodiments of the present invention.
Figure 12B:
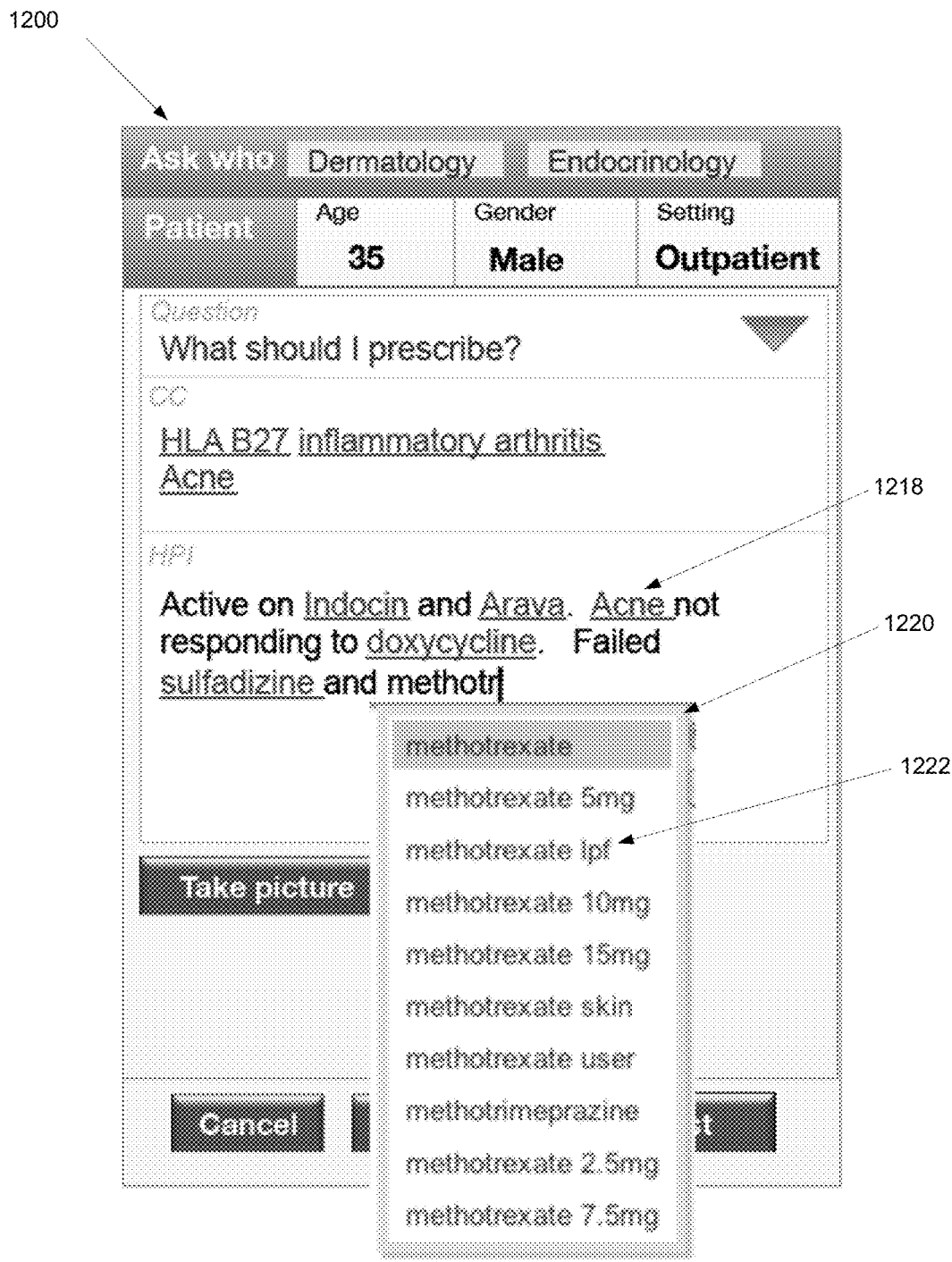

The environment and it associated computer system(s) may present various user interfaces for submitting, organizing, and reporting various information related to the environment. FIGS. 12A and 12B are diagrams showing an example interface 1200 of an online system according to one embodiment. The diagram shows a user screen that may be displayed, for example, in an interface of a browser program executing on a general purpose computer system as discussed above with reference FIGS. 10-11.

In one embodiment, interface may display a summary page personalized for a user that logs into the system. The system can be configured to display on the summary page of a user his/her name, title, date, time, and status. In addition, the system can be configured to display all the cases the user has authored, commented on, responded to, and voted on along with his/her rank in the online community. The system can be configured to also display statistics relevant to the system, such as the number of users that are online in real-time and the number of users that are registered with the online community.

In one embodiment, the user interface may interact with a user profile data structure to display user specific information on the summary page. The user profile data structure may include a reference identification data element. The reference identification data element is a user identifier that enables the system to track the user's activity within the online community. In addition, the user profile data may include a specialty data element. The specialty data element contains the list of specialty areas wherein each user is currently practicing. A rank data element may also be stored within the user profile data structure. The rank data element represented a user's status within the online community. In addition, a user preferences element may be stored within the profile data structure. The user preferences data element contains a plurality of preferences associated with the user (e.g., how to be contacts, preferred topics, etc.). A screen identifier element may also be stored within the user profile data element. The screen identifier element may include a personalized image used within the system to represent a user to other online community users.

FIGS. 12A and 12B show an example interface 1200 for creating a case according to one embodiment. For example, an environment may support respondent specialty restrictions for a given case. In the example interface 1200 relating to case creation, the system allows the user to select the necessary qualifications 1202A and 1202B that each respondent must possess in order to submit a response to the case. The system further allows the user to submit close-ended parameters to classify the case 1204A-1204C (e.g., patient age, patient gender, patient setting). The user interface may contain an interactive drop-down menu to enable a user to select a question or, alternatively, enter their own specific question 1206 into an open-ended parameter. The system accepts a description of the question or alternatively a "chief complaint" 1208 as an unstructured text parameter. The user interface may include a second unstructured text field to enable a user to add additional information to further define the question 1210. In the field of health care, for example, the second unstructured text field may be a "history of present illness" field 1210. The user interface may also allow the user to post pictures or files 1214 corresponding to the case. In one embodiment, the interface may operate on a mobile device with camera functionality. The user interface, in this example, may allow the user to take a picture with a mobile device and directly attach the image to the case 1216. The user interface can also be configured to allow the user to submit 1212 the case to the system.

In one embodiment, the user interface may interact with a case data structure stored within the system to accept user input during case creation. A restriction requirement data element may be stored in the case data structure. The restriction requirement data element may store a plurality of related specialties determined by the user within which each respondent must practice. The case data structure may, in addition, contain close-ended classifying information data elements input by the user. In the field of health care, for example, the classifying information data elements may include a patient's age, gender and setting. A question data element may be stored as either an open-ended or close-ended parameter in the case data structure. The open-ended variant of the question data element enables a user to enter a custom question while the close-ended variant of the question data element enables the user to choose the question from a list. In one example data structure, the system can be configured to store question description information, or a chief complaint, in a first unstructured text data element. The system can be configured to store, in addition, additional description information, or history of present illness information in a health care example, relating to the case in a second unstructured text data element.

The typeahead functionality, as previously discussed above in process 600 in FIG. 6, may be implemented to make suggestions to the user when entering text into any open-ended text parameter, for example, the chief complaint 1208 and additional information 1210 fields. The suggestion matched by the typeahead feature may be displayed to the user via a list box 1220 composed of concept suggestions that match the entered text fragments. Matched words may be emphasized (e.g., underlining, highlighting, display intensity, bold, color, etc.) 1218 by the system to display to the user as tags created by the system for the purposes of classifying the case. The emphasized words may also focus the user on the terms identified within the narrative associated with a matched concept. In addition, the system can be configured to list the matched concepts with a given tag when a cursor is placed over the emphasized word. In one embodiment, the system can be configured to store matched terms from the chief complaint and/or additional information fields in a tags data element associated with the case data structure. According to one embodiment, the system can be configured to perform concept matching independent of typeahead functionality. The matched concepts can be emphasized (e.g., underlining, highlighting, display intensity, bold, color, etc.) to the user.

Figure 13:
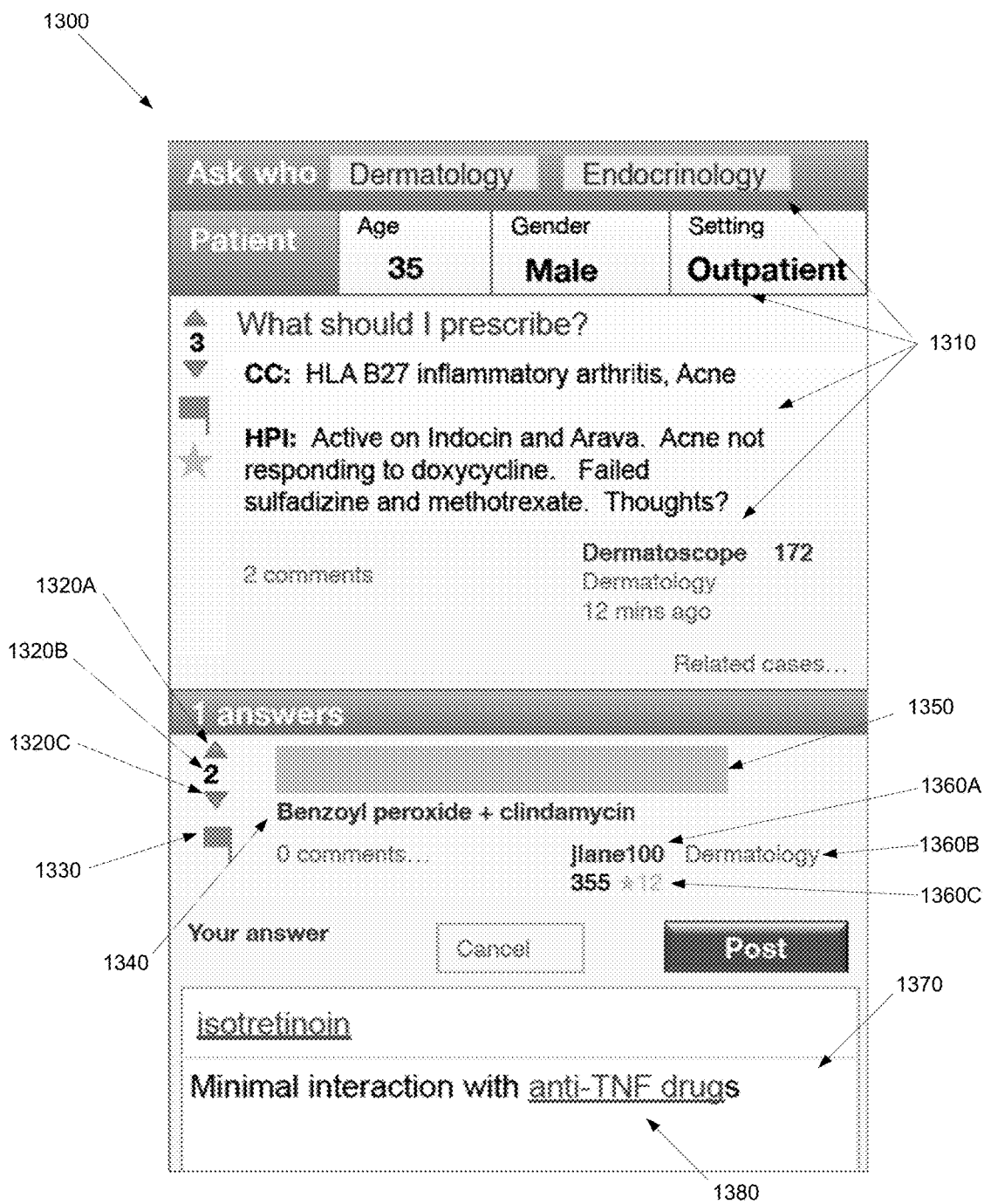
FIG. 13 is a diagram showing an example interface according to one embodiment of the present invention.

FIG. 13 shows an example interface for responding to a case according to one embodiment. For example, an environment may support responses to case questions posed to the system. The user interface 1300 may display the relating case information 1310 to the user to evaluate the case and form an appropriate response. The case information may contain all of the close-ended and open-ended parameters associated with the case that were entered during its creation from the case data structure. In addition, information related to each pre-existing response may be displayed to the user 1340. The pre-existing response information displayed to the user may include, but are not limited to, the respondent 1360A, the specialty of the respondent 1360B, the ranking in the online community of the respondent 1360C, the response submitted by the respondent 1340, the response utility score 1350, and the number of votes on a response 1320B.

In one example, the user interface may accept responses from a user in the form of votes on a pre-existing response. The system can be configured to enable up-voting or down-voting a response as seen by the up arrow 1320A corresponding to an up-vote and down arrow 1320C corresponding to a down vote. The total number of votes or the sum of the up-votes minus the sum of the down-votes may be displayed 1320B between the up arrow 1320A and the down arrow 1320C. In addition, the user interface may accept a narrative response in an open-ended parameter 1370. The system can be configured to optionally offer suggestions to the respondent while writing their own response and emphasize/tag matched concepts 1380 through a typeahead process described in process 600 in FIG. 6.

In one embodiment, the user interface may interact with a response data structure stored within the system to accept user input during response submission. A user reference information data element may be stored in the response data structure. The user reference information data element identifies the respondent within the online community. The response data structure, in addition, may contain a response description data element. The response description data element is an unstructured text field that stores a user's submitted answer or their comment on a pre-existing answer. In addition, the system can be configured to store matched concepts within the response description in a tags data element associated with the case data structure. The response data structure may also include a score element. The score element characterizes the utility of the response.

Figure 14A:
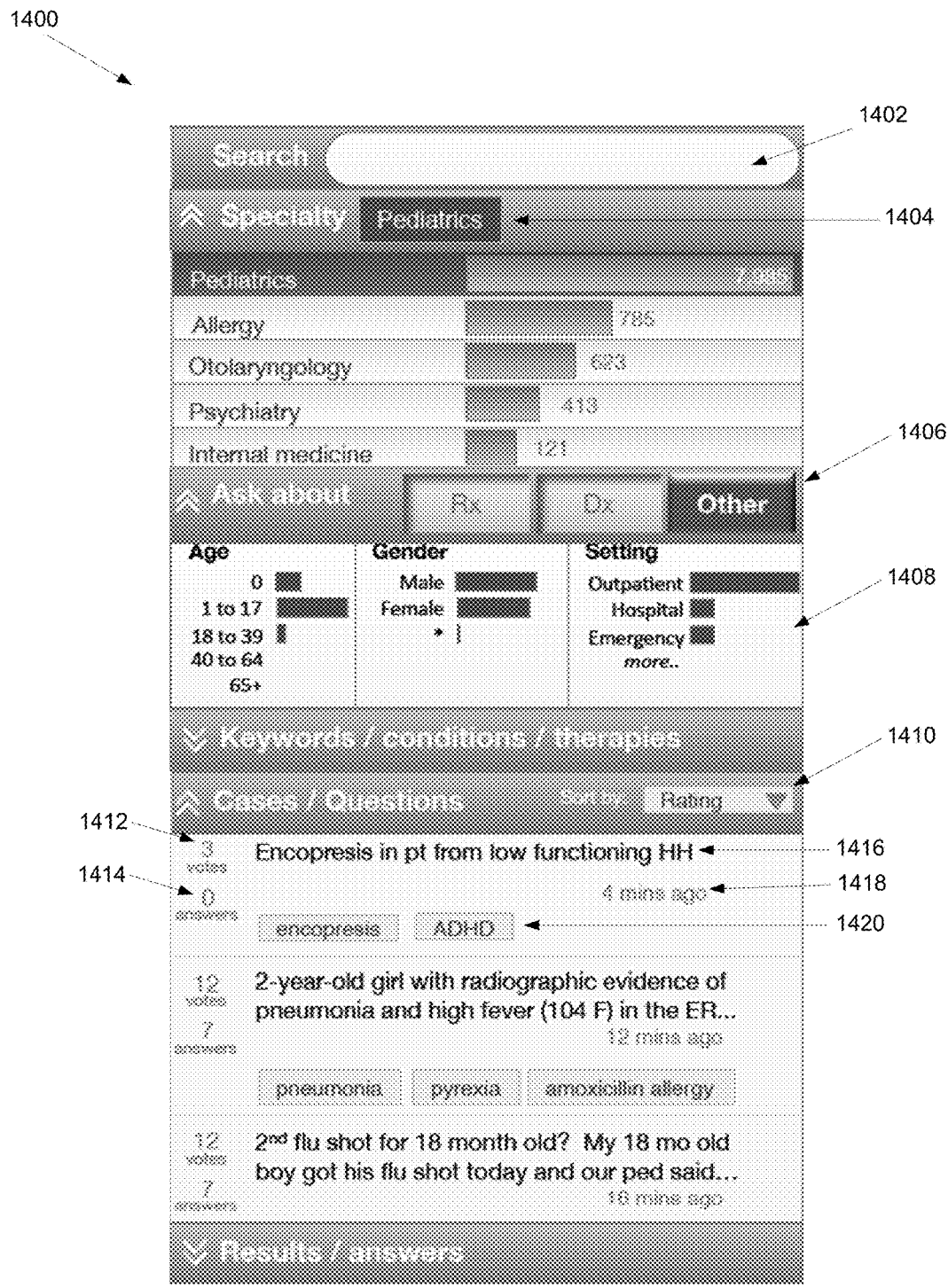
FIG. 14A-B are diagrams showing example interfaces according to various embodiments of the present invention.
Figure 14B:
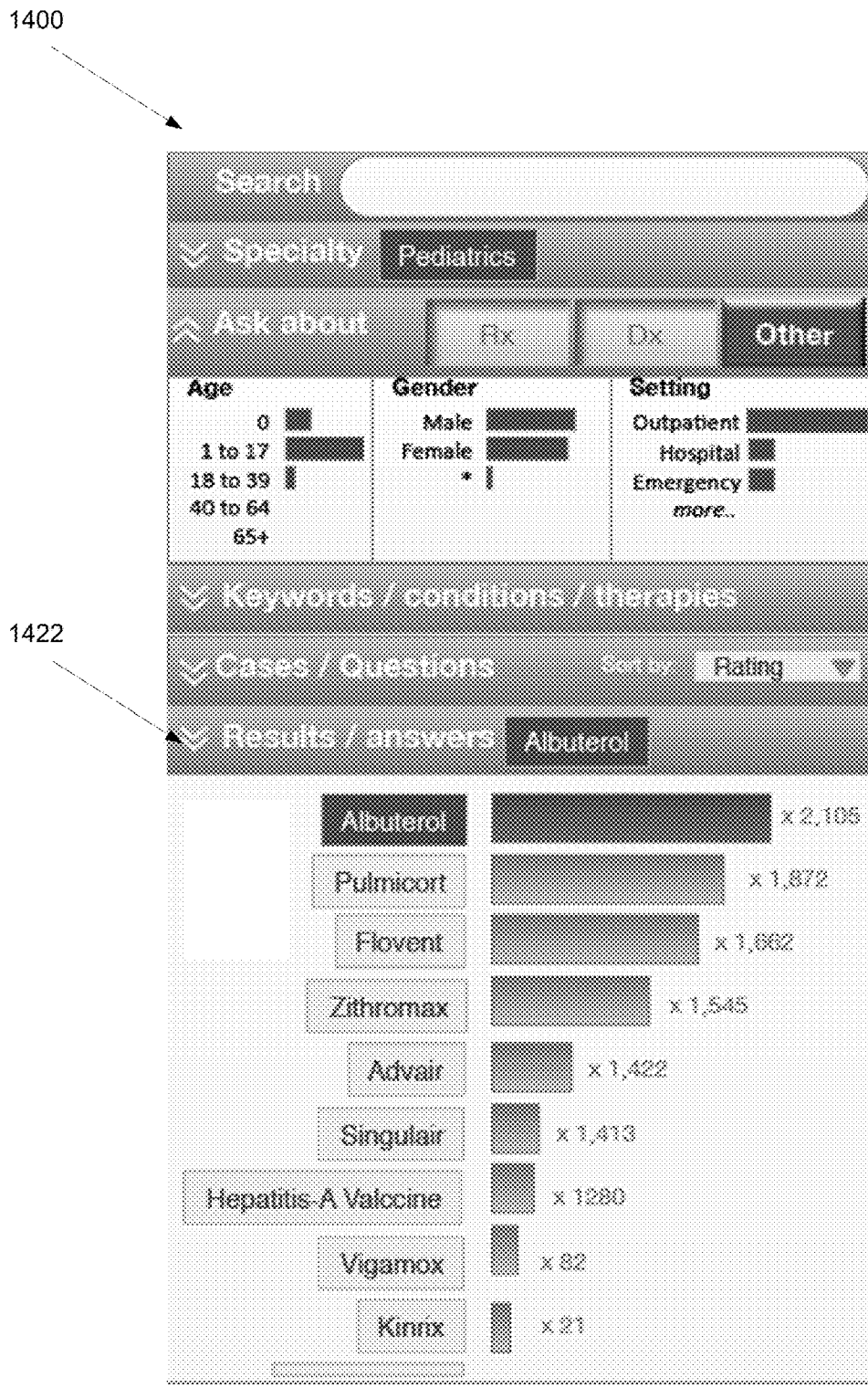

FIGS. 14A-14B show an example interface for searching or browsing cases according to one embodiment. For example, an environment may support searching and browsing capabilities for the case database. The user interface 1400 may allow a user to enter search criteria into the open-ended search bar 1402. The user interface will continually update the cases displayed to the user in addition to the statistics derived from all of the matching cases 1408. The displayed matched case statistics 1408 may include age, gender, and patient setting. The user may then select close-ended parameters either alone or in combination with the open-ended search bar. The specialty 1404 may be selected to narrow the field of interest. The question type may also be selected 1406. In a health care application, the type of question may relate to prescriptions (i.e. Rx) or optionally diagnoses (i.e. Dx) or a custom user created question.

The cases displayed may be sorted 1410 by various options which may include case rating, time of last response, and number of responses. The user interface may also display the number of votes 1412 and answers 1414 relating to each case. In addition, generic case information may be displayed to the user such as the time of last response 1418, the specific question 1418, and selected tags associated with the case 1420. The presence of tags within a specific search may be viewed graphically in the interface 1422 and sorted by frequency. In addition, specific tags may be selected to further narrow and define the search responsive to a user's selection.

Interactive Online Information Environment

In one embodiment, an online environment is created, forming an interactive online information environment. The environment may include a community of users that together, function to exchange information. In such an environment, a community is created by one or more rules influencing the behavior of a plurality of users. According to one embodiment, the rules adhere to the basic drives and ambitions of the users and channel the interested users back into the environment. In particular, rules may be designed that provide incentives (and disincentives) for certain types of behavior. Optimally, the rules encourage users to submit original questions, respond to questions, and encourage others to review the responses to foster consensus. In one embodiment, the rules function without external (other than users) or moderator intervention.

The overall environment may be driven by several processes. One process permits users to take independent actions, and the user's independent actions affect the environment. Therefore, the environment can be self-perpetuating. Further, the environment can create its own content, as users define and vote on the questions and responses of others. The environment may be self-regulating, for instance, as users determine the value of the questions and responses. One method of the driving of the environment involves recruiting new users as individuals within the environment pursue their own interests.

The environment can be manipulated to fit the interests of those that run the environment (e.g., a system operator) by generating valuable data for third parties that consume information generated by the environment. One method for ensuring that valuable data is generated includes creating rules that promote the creation of valuable data and by integrating adjustable variables into the rules.

Such an environment may be applied to different problems, markets, and subject areas. One such application is health care, and the field of medicine in general. The health care industry is a good application of such a system, as there are a number of readily available customers for the information generated by the environment. For instance, the environment may permit physicians to further their understanding of uncommon ailments by posing a question to specialists within the health care community. Another application includes tracking of prescriptions for specific ailments to provide pharmaceutical companies insight as to what treatments physicians most often prescribe.

The environment can successfully exploit multiple behaviors of various users, such as greed, drive for collaboration, and humanitarianism. Because there is a continuous need for information, the information of the environment is self-renewing and replenishes itself continuously. Although health care is one application of such an environment, it should be appreciated that the invention is not limited to any specific field, and may be applied to other information-sharing situations where collaboration facilitates information that has value.

In one example application of such a system, a value of a physician's response to a user's specific question (modeled in the system in the form of a "case") in the system is determined by how many people agree or disagree with the response at any given moment. Physicians from diverse backgrounds are incentivized to submit responses and to corroborate or dispute those responses in the system, providing a resultant method by which clinical data may be gathered. Further, a ranking of users may be determined, used in part to determine a utility value of responses, and to incentivize desired responses and/or voting behavior.

Example Environment

In one example implementation, a system is provided that permits a user to perform a number of actions relating to questions submitted by users. In one particular embodiment, the user may submit question specific responses, comment on existing responses, or vote on existing responses. In one example implementation, the question may be represented in the system in the form of a case. In the example, the case is a construct that permits a question to be shared and viewed by other users as well as allowing the system to track the question as it progresses through the environment.

A user may create a question by creating a case that describes the question. In one example, the case includes a number of parameters including close-ended and/or open-ended parameters. In one example for a health care application, the close-ended parameters may include patient gender, age, and setting, and the open-ended parameters may include a narrative and pictures. In another example, the length of the narrative of the question associated with the case may be any length (e.g., no minimum or maximum length). In other words, the question description can be as long as a user wants, or as short as he/she wants.

According to another embodiment, the case may also include classification information, either part of or separate from the case, the classification information indicating an organization of the case such that the case may be easily located. In another embodiment, it is appreciated that the system can be configured to match concepts from an ontology database to the user's input into an open-ended text field, such as the narrative field in a case. The system can be configured to create tags based upon the matched concepts in the case narrative to aid in organization and classification. Because cases have associated tags, cases with similar or the same tags may be located more easily by a system or an associated user. Further, actions may be performed in response to tag information, such as alerting a user when a case having a particular tag is created, locating similar cases using tag information, and other actions relating to the organization and control of cases.

According to another embodiment, the system can be configured to present to the user an interface that provides real-time feedback of classification information as the user enters information associated with the cases. For instance, a list of related cases may be presented to the user, and while the user enters description information of the case, the list of the most relevant cases may be changed in response to the entry of the user. In this way, the feedback permits users to create better cases (by seeing already existing cases in the database) and also permits the user to easily locate similar cases (e.g., by selecting cases presented in real-time to the user in the interface).

Also, the user may be permitted to express an opinion on an existing question by voting or commenting on an existing response. In another embodiment, the user may be permitted to submit a response to the question. The response may include a narrative to describe and qualify the response.

In one embodiment, when a user creates a case, the user classifies the case. The classifications may include but are not limited to classifying the case as a particular type of question. There may be more or less classification types, depending on the application, but are generally referred to herein as a question. The cases may also be classified by the user and/or system. For instance, tags or other classification information may be associated with a case.

In one embodiment, the online system can be configured to assign each case a "value." Depending on the subject matter of the question, the case may be assigned an initial value, which may be adjusted depending on the market value of the case (e.g., the value of the case as determined by a bid process involving interested information consumers) and/or the opinions (e.g., in the form of votes) set forth by other users relating to the case.

The values may be assigned in real-time, when the case is created, however, the initial value can be revisited with the value on any given case increased or decreased as needed to promote the health of the environment. Health of the environment may be monitored, for example, by measuring a number of votes received in a particular area or case. Once submitted, any other users can vote on a case or submit an alternative answer with a case as well as forward the case to any other users inside or outside the environment.

The user may also be "charged" a currency for voting on a case. For instance, the user may be provided a particular number of points or other credit, and decremented each time the user votes on a case. The user's credit may be increased in response to a positive behavior exhibited by the user in the environment (e.g., the user creates cases, provides early votes, becomes an expert in a particular field, etc.). In this manner, the system rewards positive behavior and encourages participation in the environment.

The environment may have a number of different types of consumers and providers of information. Users that provide questions may or may not be charged a fee for accessing the environment, but in one embodiment of the environment, information consumers are charged for their use and access to the questions and responses provided by and ability of the system to establish communication between others. In one example system, consumers may be charged a subscription fee to search/browse cases within the environment. Such fees may be used, for example, to maintain the environment. In another example system, the results of a submitted question may not be shown to the public. In yet another example, the results of the case may be the exclusive property of the consumer for a fixed period of time (e.g., 60 days) after which, the results are published to the environment.

In such an environment, it is appreciated that there may be trade-off between consensus and early response, but according to one embodiment, such a model according to various embodiments may perform more quickly and accurately than conventional survey models. In one such system, a customer/information consumer may be permitted to set predefined "triggers" that alert the consumer if/when a user (e.g., a physician) makes a question of interest. The consumer may then be able to identify to the environment how many users would need to vote on that question for the corresponding responses to be valuable to them. The system can be configured to determine the current voting rates for the desired population of users, the amount of incentives (e.g., money) that needs to be applied, and when the consumer agrees, that consumer may be granted exclusive access to the result information. Optionally, users that vote on the question may be made available to the consumer for direct contact, permitting the consumer to more quickly and effectively reach a targeted group that has the necessary insight and/or experience in a given area.

This invention is not limited in its application to the details of construction and the arrangement of components set forth in the previous description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and/or variations thereof in this document, is meant to encompass the items listed thereafter and equivalents thereof as well as additional items. Such terms are to be construed as open-ended, that is, to mean including but not limited to.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for interacting with an online information environment, the system comprising:
at least one processor operatively connected to a memory, the at least one processor configured to execute a plurality of system components from the memory, the system components comprising a user interface component configured to:
    display a creation view configured for creating a case and comprising an open-ended text field to receive text indicative of a chief complaint of a patient and a first close-ended data field to receive a parameter indicative of an age of the patient;
    generate and display a list of suggested clinical terms to add to the open-ended text field using at least one text fragment from the text indicative of the chief complaint of the patient and the age of the patient;
    identify and emphasize key terms in the text indicative of the chief complaint of the patient the open-ended text field;
    assign one or more classification tags to the case based on the identified key terms;
    display a response view configured for responding to the case and comprising a display of information regarding the case, a display of at least one previously submitted response to the case, and an open-ended text field to receive a response to the case;
    display a search view configured for searching a database of cases, the database configured to store the cases as data objects including case information, the case information including a question, a specialty requirement for the case, and at least one concept, and comprising a search field; and
    match terms in the search field with the one or more classification tags to identify relevant cases.

2. The system according to claim 1, further comprising an ontology database storing clinical terms organized by concept and wherein the user interface component is configured to generate the list of suggested clinical terms at least on part by matching the at least one text fragment with concepts from the ontology database.

3. The system according to claim 1, wherein the creation view includes a first section comprising the first close-ended data field and a second close-ended data field.

4. The system according to claim 3, wherein the second close ended data field in the first section of the creation view accepts data into the specialty requirement parameter of the case.

5. The system according to claim 3, wherein the creation view includes a second section comprising at least one data field that is configurable between an open-ended data field and a close-ended data field.

6. The system according to claim 5, wherein the at least one data field that is configurable between an open-ended data field and a close-ended data field accepts data into the question parameter of the case.

7. The system according to claim 1, wherein the response view includes a first section configured to display the question, the specialty requirement, and the at least one concept of the case.

8. The system according to claim 1, wherein the user interface component is configured to continuously update a list of cases in a second section of the search view responsive to text input into a first open-ended text parameter in a first section of the search view.

9. The system according to claim 8, wherein the search view includes a third section configured to graphically display statistics of the list of cases in the second section of the search view.

10. The system according to claim 9, wherein the search view includes a fourth section configured to graphically display the frequency of concepts in the list of cases.

11. The system according to claim 1, wherein the user interface component is configured to transition from the creation view to the search view responsive to user input.

12. A computer implemented method for interacting with an online environment, the method comprising:
    displaying a creation view configured for creating a case and comprising an open-ended text field to receive text indicative of a chief complaint of a patient and a first close-ended data field to receive a parameter indicative of an age of the patient;
    generating and displaying a list of suggested clinical terms to add to the open-ended text field using at least one text fragment from the text indicative of the chief complaint of the patient and the age of the patient;
    identifying and emphasizing key terms in the open-ended text field;

assigning one or more classification tags to the case based on the identified key terms;

displaying a response view configured for responding to a case and comprising a display of information regarding the case, a display of at least one previously submitted response to the case, and an open-ended text field to receive a response to the case;

displaying a search view configured for searching a database of cases, the database configured to store the cases as data objects including case information, the case information including a question, a specialty requirement for the case, and at least one concept, and comprising a search field; and matching terms in the search field with the one or more classification tags to identify relevant cases.

13. The method according to claim 12, wherein generating and displaying the list of suggested clinical terms comprises communicating with an ontology database storing medical terms organized by concept and matching the at least one text fragment with concepts from the ontology database.

14. The method according to claim 12, wherein displaying the creation view includes displaying a first section comprising the first close-ended data field and a second close-ended data field.

15. The method according to claim 14, wherein displaying the creation view includes accepting the specialty requirement parameter of the case in the second close ended data field in the first section of the creation view.

16. The method according to claim 14, wherein displaying the creation view includes displaying a second section comprising at least one data field that is configurable between an open-ended data field and a close-ended data field.

17. The method according to claim 16, wherein displaying the creation view includes accepting the question parameter of the case in the at least one data field that is configurable between an open-ended data field and a close-ended data field.

18. The method according to claim 12, wherein displaying the response view includes displaying a first section configured to display the question, the specialty requirement, and the at least one concept of the case to the user.

19. The method according to claim 12, wherein displaying the search view includes continuously updating a list of cases in a second section of the search view responsive to text input into a first open-ended text parameter in a first section of the search view.

20. The method according to claim 19, wherein displaying the search view includes displaying a third section configured to graphically display statistics of the list of cases in the second section of the search view.

21. The method according to claim 20, wherein displaying the search view includes displaying a fourth section configured to graphically display the frequency of concepts in the list of cases.

22. The method according to claim 20, wherein displaying the list of cases in the second section of the search view includes ranking the cases responsive to user input on a button in the second section of the search view.

23. The method according to claim 12, wherein displaying the creation view includes transitioning to displaying the search view responsive to user input.

* * * * *